United States Patent
Sato et al.

(10) Patent No.: US 11,508,335 B2
(45) Date of Patent: Nov. 22, 2022

(54) DISPLAY APPARATUS AND DISPLAY METHOD WITH BRIGHTNESS CONVERSION

(71) Applicant: CANON KABUSHIKI KAISHA, Tokyo (JP)

(72) Inventors: Masahiro Sato, Tokyo (JP); Hirofumi Urabe, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/204,744

(22) Filed: Mar. 17, 2021

(65) Prior Publication Data

US 2021/0304702 A1    Sep. 30, 2021

(30) Foreign Application Priority Data

Mar. 24, 2020 (JP) .............................. JP2020-052484

(51) Int. Cl.
| | |
|---|---|
| *G09G 5/10* | (2006.01) |
| *G09G 5/00* | (2006.01) |
| *G09G 5/14* | (2006.01) |
| *G06T 5/00* | (2006.01) |
| *G06T 7/90* | (2017.01) |

(52) U.S. Cl.
CPC ............. *G09G 5/10* (2013.01); *G06T 5/009* (2013.01); *G09G 5/14* (2013.01); *G06T 2207/20208* (2013.01); *G09G 2320/0276* (2013.01); *G09G 2320/0626* (2013.01); *G09G 2354/00* (2013.01)

(58) Field of Classification Search
CPC combination set(s) only.
See application file for complete search history.

(56) References Cited

U.S. PATENT DOCUMENTS

| | | | |
|---|---|---|---|
| 2017/0223330 A1* | 8/2017 | Oh | G09G 5/04 |
| 2017/0287120 A1* | 10/2017 | Sato | G06T 5/009 |
| 2018/0352206 A1* | 12/2018 | Uchimura | G11B 27/10 |
| 2018/0365817 A1* | 12/2018 | Sato | G06T 11/60 |
| 2019/0052908 A1* | 2/2019 | Mertens | H04N 19/102 |
| 2020/0013198 A1* | 1/2020 | Endo | H04N 17/04 |
| 2020/0134882 A1* | 4/2020 | Sato | G06T 7/90 |

FOREIGN PATENT DOCUMENTS

JP    2017181762 A    10/2017

* cited by examiner

*Primary Examiner* — Wesner Sajous
(74) *Attorney, Agent, or Firm* — Canon U.S.A., Inc. IP Division

(57) ABSTRACT

A display apparatus includes at least one memory and at least one processor which function as a processing unit, a display control unit, and a setting unit. The processing unit is configured to perform first image processing and second image processing. The display control unit is configured to perform control to perform a first display based on a result of the first image processing and a second display based on a result of the second image processing, together. The setting unit is configured to set upper-limit brightness of the second display. An Electro-Optical Transfer Function (EOTF) type of the first display and an EOTF type of the second display are EOTF types dealing with high dynamic range (HDR). The processing unit converts brightness of an image according to the upper-limit brightness and the EOTF type of the first display in the second image processing.

16 Claims, 13 Drawing Sheets

| SETTING BRIGHTNESS (cd/m$^2$) | COMPARISON BRIGHTNESS (cd/m$^2$) |
|---|---|
| 1001 TO 2000 | 1000 |
| 601 TO 1000 | 600 |
| 401 TO 600 | 400 |
| 201 TO 400 | 200 |
| NOT MORE THAN 200 | 100 |

FIG. 4

|  | MAIN DISPLAY | SUB-DISPLAY |
|---|---|---|
| BRIGHTNESS GAIN VALUE | SPECIFIED BY USER | CALCULATED FROM COMPARISON BRIGHTNESS |
| COLOR GAMUT TYPE | SPECIFIED BY USER | SAME AS MAIN DISPLAY |
| EOTF TYPE | SPECIFIED BY USER | SAME AS MAIN DISPLAY |
| DISPLAY RANGE (FOR PQ) | SPECIFIED BY USER | CALCULATED FROM COMPARISON BRIGHTNESS |
| SYSTEM GAMMA (FOR HLG) | SPECIFIED BY USER | CALCULATED FROM COMPARISON BRIGHTNESS |

FIG. 5

|  | OPTIONS |
|---|---|
| COMPARISON DISPLAY MODE | ENABLED/DISABLED |
| COMPARISON BRIGHTNESS | 100 TO 1000 |
| MAXIMUM BRIGHTNESS OF DISPLAY RANGE (FOR PQ) | 100 TO 1000 |
| SYSTEM GAMMA (FOR HLG) | 1.0 TO 1.5 |

SETTING BRIGHTNESS: 2000cd/m²     COMPARISON BRIGHTNESS: 1000cd/m²
DISPLAY RANGE: 2000cd/m²     DISPLAY RANGE: 1000cd/m²

SETTING BRIGHTNESS: 2000cd/m²     COMPARISON BRIGHTNESS: 1000cd/m²
DISPLAY RANGE: 2000cd/m²     DISPLAY RANGE: 1000cd/m²

SETTING BRIGHTNESS: 2000cd/m$^2$
SYSTEM GAMMA: 1.33

COMPARISON BRIGHTNESS: 1000cd/m$^2$
SYSTEM GAMMA: 1.2

FIG. 8
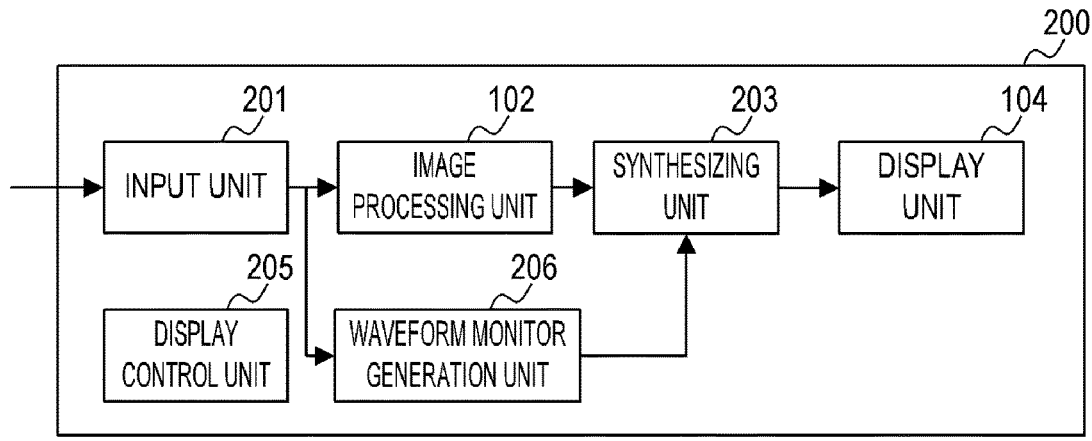
FIG. 9
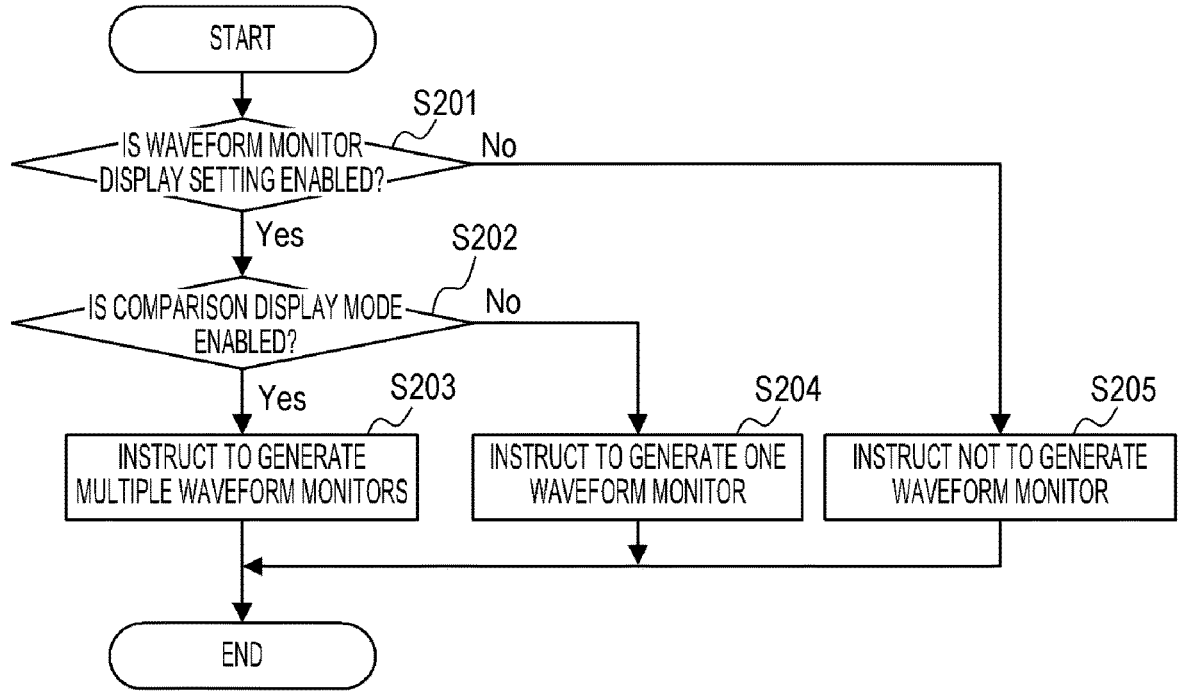
FIG. 10
| BRIGHTNESS RANGE (cd/m²) | DISPLAY COLOR OF WAVEFORM IN WAVEFORM MONITOR CORRESPONDING TO MAIN DISPLAY | DISPLAY COLOR OF WAVEFORM IN WAVEFORM MONITOR CORRESPONDING TO SUB-DISPLAY |
|---|---|---|
| 2000 TO 10000 | RED | RED |
| 1000 TO 2000 | WHITE | ORANGE |
| 0 TO 1000 | WHITE | WHITE |

FIG. 14
| BRIGHTNESS RANGE (cd/m²) | DISPLAY COLOR OF MAIN DISPLAY | DISPLAY COLOR OF SUB-DISPLAY |
|---|---|---|
| 2000 TO 10000 | RED | RED |
| 1000 TO 2000 | MONOCHROME | ORANGE |
| 0 TO 1000 | MONOCHROME | MONOCHROME |
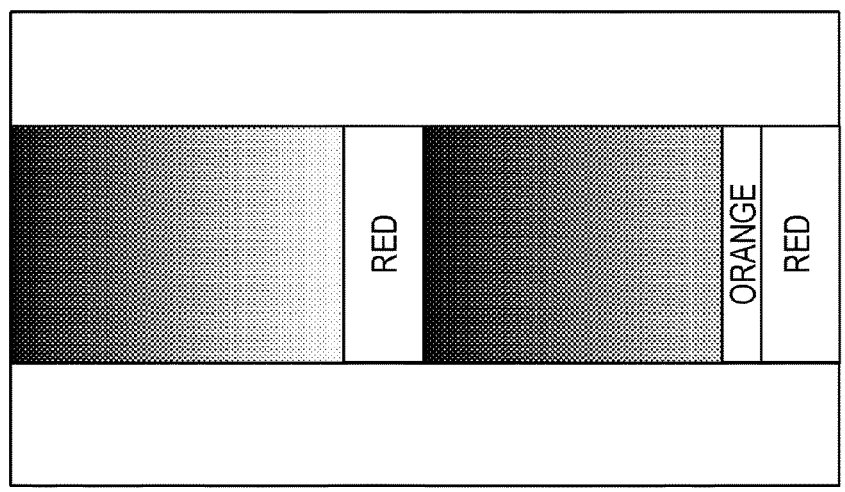
FIG. 15
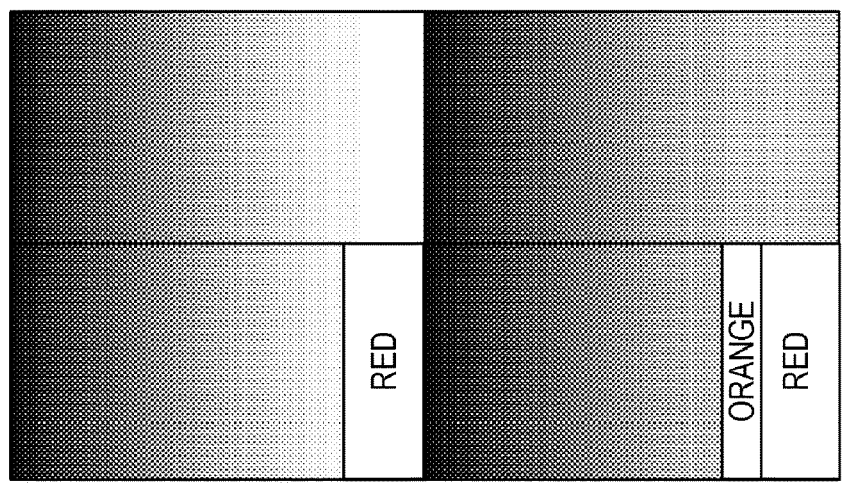
FIG. 16

FIG. 17A

| | UPPER-LEFT MAIN DISPLAY | UPPER-RIGHT SUB-DISPLAY | LOWER-LEFT SUB-DISPLAY | LOWER-RIGHT SUB-DISPLAY |
|---|---|---|---|---|
| BRIGHTNESS GAIN VALUE | 1.0 | 0.5 | 0.25 | 0.025 |
| COLOR GAMUT TYPE | BT.2020 | BT.2020 | BT.2020 | BT.709 |
| EOTF TYPE | PQ | PQ | PQ | 2.2 |
| DISPLAY RANGE | 4000 | 2000 | 1000 | — |

FIG. 17B

| | UPPER-LEFT MAIN DISPLAY | UPPER-RIGHT SUB-DISPLAY | LOWER-LEFT SUB-DISPLAY | LOWER-RIGHT SUB-DISPLAY |
|---|---|---|---|---|
| BRIGHTNESS GAIN VALUE | 1.0 | 0.5 | 0.25 | 0.025 |
| COLOR GAMUT TYPE | BT.2020 | BT.2020 | BT.2020 | BT.709 |
| EOTF TYPE | HLG | HLG | HLG | 2.2 |
| SYSTEM GAMMA | 1.45 | 1.33 | 1.2 | — |

DISPLAY APPARATUS AND DISPLAY METHOD WITH BRIGHTNESS CONVERSION

BACKGROUND

Technical Field

One disclosed aspect of the embodiments relates to a display apparatus and a display method.

Description of the Related Art

In recent years, there has been an increased opportunity to work with the video of a dynamic range (high dynamic range: HDR) wider than a conventional standard dynamic range (SDR) in the field of video production. Examples of the system (standard) of the video signal of the HDR include perceptual quantizer (PQ) and Hybrid Log-Gamma (HLG) stipulated by ITU-R (Radio Communication Sector of ITU) BT.2100.

A PQ system is allowed to use a brightness of up to 10000 $cd/m^2$. However, most display apparatuses are allowed to display a brightness of only 400 $cd/m^2$, 600 $cd/m^2$, 1000 $cd/m^2$, 2000 $cd/m^2$, or the like lower than 10000 $cd/m^2$. Therefore, the display apparatuses complying with the PQ system include the following display apparatuses.

Display apparatuses that display a signal with halation when the signal of brightness not allowed to be displayed is input.

Display apparatuses in which a display range that is a brightness range (brightness range not displayed due to halation) used for a display among the brightness ranges of an input signal is settable by a user.

In an HLG system, a system gamma value is used as a parameter in the definitional equation of an Electro-Optical Transfer Function (EOTF), and image quality is finely adjustable by changing the system gamma value. Display apparatuses complying with the HLG system include the following display apparatuses.

Display apparatuses in which the system gamma value is fixed at 1.2.

Display apparatuses in which the system gamma value is settable by a user.

In the video production of HDR video contents, there is a need to confirm a difference in the display image quality between a plurality of display apparatuses having different displayable upper-limit brightness with a single display apparatus. That is, there is a need to make a comparison of the display image quality of a plurality of display apparatuses with a single display apparatus.

Japanese Patent Application Laid-open No. 2017-181762 discloses a display apparatus that performs image processing to display an SDR signal with brightness lower than that of an HDR signal when displaying the HDR signal (HDR video signal) and the SDR signal (SDR video signal) together.

Besides, there are some display apparatuses capable of separately setting image processing to a plurality of display areas (a plurality of areas of a display surface) and making display image quality different between the plurality of display areas by making image processing applied to a signal different between the plurality of display areas. For example, there are some display apparatuses capable of displaying an HDR signal and an SDR signal after EOTF processing side by side by making the EOTF processing for the HDR signal and the EOTF processing for the SDR signal different.

However, even if a display apparatus capable of separately setting image processing to respective display areas is used, a user is not allowed to easily confirm a difference in display image quality between a plurality of display apparatuses. As an example, consideration is given to a case in which the same HDR signal is displayed with image quality different between respective display areas. This case is troublesome (requires a complicated operation) since a user is required to separately specify various parameters such as the upper-limit brightness of a display, a EOTF type, a color gamut type, a display range in a case in which the EOTF type is PQ, and a system gamma value in a case in which the EOTF type is HLG for respective display areas.

As an example, consideration is given to a case in which image processing to decrease only brightness is performed and the HDR signal of a PQ system is displayed with 2000 $cd/m^2$ and 1000 $cd/m^2$ (each showing the upper-limit brightness of a display). FIG. 19 shows an example of the relationship between signal brightness (brightness expressed by an HDR signal) and display brightness in such a case. A line 1001 shows a relationship in a case in which the HDR signal is displayed with 2000 $cd/m^2$, and a line 1002 shows a relationship in a case in which the HDR signal is displayed with 1000 $cd/m^2$. As shown in FIG. 19, display brightness in a case in which the HDR signal is displayed with 1000 $cd/m^2$ is lower than display brightness in a case in which the HDR signal is displayed with 2000 $cd/m^2$ over the whole range of the signal brightness. However, a display range (a range in which the display brightness changes with respect to a change in the signal brightness among the ranges of the signal brightness) is the same between the case in which the HDR signal is displayed with 2000 $cd/m^2$ and the case in which the HDR signal is displayed with 1000 $cd/m^2$. In FIG. 19, the display range is a brightness range of up to 2000 $cd/m^2$ (brightness range of 0 to 2000 $cd/m^2$). Therefore, a user is not allowed to confirm a difference in display image quality due to a difference in the display range. The confirmation of such a difference in the display image quality is troublesome (complicated in operation) since the user is required to specify (change) the display range.

Similarly, in a case in which image processing to decrease only brightness is performed and the HDR signal of a HLG system is displayed with 2000 $cd/m^2$ and 1000 $cd/m^2$ (each showing the upper-limit brightness of a display), a system gamma value is the same between the display with 2000 $cd/m^2$ and the display with 1000 $cd/m^2$. Therefore, a user is not allowed to confirm a difference in display image quality due to a difference in the system gamma value. The confirmation of such a difference in the display image quality is troublesome (complicated in operation) since the user is required to specify (change) the system gamma value.

SUMMARY

An embodiment provides a display apparatus with which a user is allowed to easily confirm a difference in the display image quality between a plurality of display apparatuses having different displayable upper-limit brightness.

A first embodiment provides a display apparatus including at least one memory and at least one processor which function as a processing unit, a display control unit, and a setting unit. The processing unit is configured to perform first image processing and second image processing. The display control unit is configured to perform control to perform a first display based on a result of the first image processing and a second display based on a result of the second image processing, together. The setting unit is configured to set upper-limit brightness of the second display. An EOTF type of the first display and an EOTF type of the second display are EOTF types dealing with HDR. The processing unit performs brightness conversion to convert brightness of an image according to the upper-limit brightness set by the setting unit and the EOTF type of the first display in the second image processing.

A second embodiment provides a display apparatus including at least one memory and at least one processor which function as a processing unit, a display control unit, and a generation unit. The processing unit is configured to perform first image processing and second image processing. The display control unit is configured to perform control to perform a first display based on a result of the first image processing and a second display based on a result of the second image processing, together. The generation unit is configured to generate first information showing a brightness distribution corresponding to the first display and second information showing a brightness distribution corresponding to the second display. The display control unit performs control to perform the first display, the second display, a display of the first information, and a display of the second information together. An EOTF type of the first display and an EOTF type of the second display are EOTF types dealing with HDR of absolute brightness. The generation unit generates the first information or the second information such that a difference between a display range of the first display and a display range of the second display is identifiable in the display of the first information or the second information.

A third embodiment provides a display apparatus including at least one memory and at least one processor which function as a processing unit and a display control unit. The processing unit is configured to perform first image processing and second image processing. The display control unit is configured to perform control to perform a first display based on a result of the first image processing and a second display based on a result of the second image processing, together. An EOTF type of the first display and an EOTF type of the second display are EOTF types dealing with HDR of absolute brightness. The processing unit further performs predetermined image processing such that a difference between a display range of the first display and a display range of the second display is identifiable in the first display or the second display.

A fourth embodiment provides a display method including performing first image processing and second image processing, performing control to perform a first display based on a result of the first image processing and a second display based on a result of the second image processing, together, and setting upper-limit brightness of the second display. An EOTF type of the first display and an EOTF type of the second display are EOTF types dealing with HDR. Brightness conversion is performed to convert brightness of an image according to the upper-limit brightness and the EOTF type of the first display in the second image processing.

A fifth embodiment provides a display method including performing first image processing and second image processing, performing control to perform a first display based on a result of the first image processing and a second display based on a result of the second image processing, together, and generating first information showing a brightness distribution corresponding to the first display and second information showing a brightness distribution corresponding to the second display Control is performed to perform the first display, the second display, a display of the first information, and a display of the second information together. An EOTF type of the first display and an EOTF type of the second display are EOTF types dealing with HDR of absolute brightness. The first information or the second information is generated such that a difference between a display range of the first display and a display range of the second display is identifiable in the display of the first information or the second information.

A sixth embodiment provides a display method including performing first image processing and second image processing, and performing control to perform a first display based on a result of the first image processing and a second display based on a result of the second image processing, together. An EOTF type of the first display and an EOTF type of the second display are EOTF types dealing with HDR of absolute brightness. Predetermined image processing is further performed such that a difference between a display range of the first display and a display range of the second display is identifiable in the first display or the second display.

A seventh embodiment provides a non-transitory computer readable medium that stores a program. The program causes a computer to execute any one of the above mentioned display methods.

Further features of the disclosure will become apparent from the following description of exemplary embodiments with reference to the attached drawings.

BRIEF DESCRIPTION OF THE DRAWINGS

FIG. 4 is a diagram showing an example of a method for determining various parameters according to the first embodiment.

FIG. 5 is a diagram showing an example of various parameters relating to a sub-display according to the first embodiment.

FIG. 8 is a block diagram showing a configuration example of a display apparatus according to a second embodiment.

FIG. 9 is a flowchart showing an example of waveform monitor instruction processing according to the second embodiment.

FIG. 10 is a diagram showing an example of display color information according to the second embodiment.

FIG. 14 is a diagram showing an example of conversion color information according to the third embodiment.

FIG. 15 is a diagram showing a display example according to the third embodiment.

FIG. 16 is a diagram showing a display example according to the third embodiment.

FIGS. 17A and 17B are diagrams showing an example of an image processing content according to a fourth embodiment.

DESCRIPTION OF THE EMBODIMENTS

First Embodiment: Hereinafter, a first embodiment will be described. The first embodiment will describe an example in which a plurality of displays (comparison display) imitating a plurality of display apparatuses having different displayable upper-limit brightness are commonly performed by a single display apparatus. Specifically, an example in which a comparison display is multi-display in which a plurality of images are displayed side by side with different image quality will be described. Note that the comparison display may be an area-dividing display in which a display is performed such that the image quality of display brightness is different between a plurality of areas of the images.

Figures 1, 2:
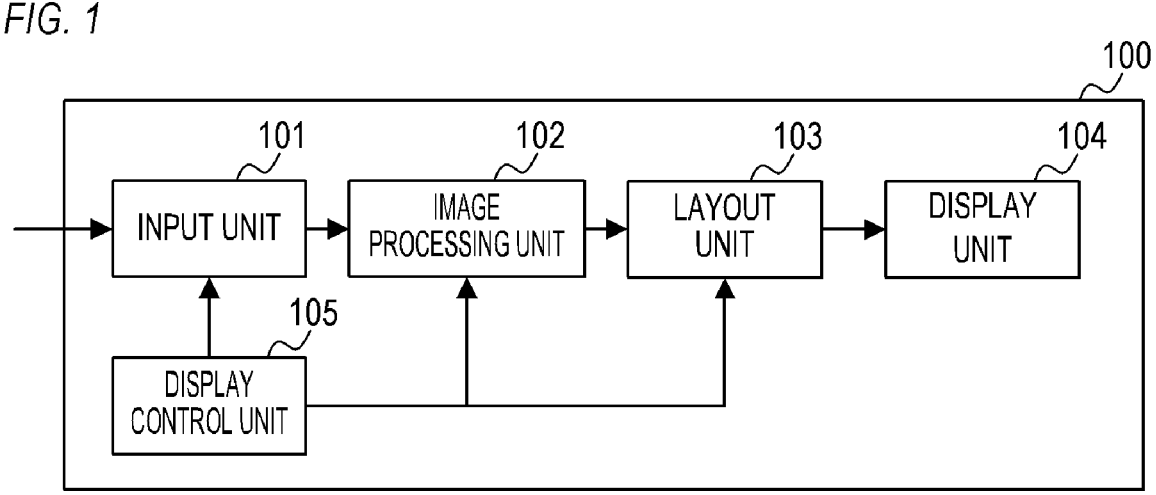
FIG. 1 is a block diagram showing a configuration example of a display apparatus according to a first embodiment.
FIG. 2 is a diagram showing an example of the relationship between setting brightness and comparison brightness according to the first embodiment.

FIG. 1 is a block diagram showing a configuration example of a display apparatus 100 according to the first embodiment. The display apparatus 100 has an input unit 101, an image processing unit 102, a layout unit 103, a display unit 104, and a display control unit 105. The display apparatus 100 is capable of performing a display of up to 2000 cd/m². That is, the upper limit of displayable brightness in the display apparatus 100 is 2000 cd/m². Note that the upper limit of the displayable brightness is not particularly limited and may be higher or lower than 2000 cd/m².

The input unit 101 receives an image signal from an external apparatus such as an imaging apparatus and a reproducing apparatus and outputs the received image signal (input image signal) to the image processing unit 102. The input unit 101 has an input terminal complying with a standard such as Serial Digital Interface (SDI) and High-Definition Multimedia Interface (HDMI). Further, the input unit 101 is capable of duplicating the same image signal as an image signal input to the input unit 101, and outputting a plurality of image signals that are the same as the image signal input to the input unit 101. Therefore, the input unit 101 outputs one or a plurality of image signals to the image processing unit 102 in response to instructions from the display control unit 105. Note that the input unit 101 may receive a plurality of image signals from the external apparatus and output the received image signals to the image processing unit 102. In this case, the plurality of image signals may be the same or different from each other. In a case in which the display apparatus 100 has a storage unit, the input unit 101 may acquire (read) the image signal of an image stored in the storage unit and output the acquired image signal to the image processing unit 102.

The image processing unit 102 applies image processing to an image signal input from the input unit 101 to the image processing unit 102 according to parameters (image quality parameters; image processing parameters) instructed from the display control unit 105 and outputs the image signal after the image processing to the layout unit 103. The parameters instructed from the display control unit 105 include, for example, the following parameters.

An Electro-Optical Transfer Function (EOTF) type such as PQ, HLG, and gamma 2.2.

A color gamut type such as ITU-R BT.709 and ITU-R BT.2020.

A brightness gain value.

A display range (in a case in which the EOTF type is perceptual quantizer (PQ)) that is a brightness range (a brightness range in which a display is not performed due to halation; a brightness range in which a display is not performed due to clipping) used for a display among the brightness ranges of an image signal input to the image processing unit 102.

A system gamma value (in a case in which the EOTF type is Hybrid Log-Gamma (HLG)) that is a conversion parameter for gradation conversion in which the gradation value of an input signal input to the image processing unit 102 is converted into a gradation value corresponding to displayed brightness.

The brightness gain value is a parameter for controlling display brightness (brightness on a display surface). In the first embodiment, the brightness gain value is a value of 0 to 1. When the brightness gain value is, for example, 0.5, the image processing unit 102 performs image processing such that a display is performed with brightness of up to 0.5 times as high as the upper limit of the displayable brightness in the display apparatus 100.

When a plurality of image signals are input to the image processing unit 102, that is, when performing a multi-display, the image processing unit 102 is capable of performing different image processing on the plurality of image signals. Similarly, when performing an area-dividing display, the image processing unit 102 is capable of performing different image processing on a plurality of image areas of an image signal (a plurality of areas in an image).

The layout unit 103 performs layout processing on one or a plurality of image signals input from the image processing unit 102 to the layout unit 103. Thus, a display signal in which one or a plurality of images are arranged is generated. The layout unit 103 outputs a generated display signal to the display unit 104. Note that areas in which images are arranged (combinations of positions and sizes, combinations of start points and end points, or the like) are indicated by the display control unit 105.

The display unit 104 is a display module (display panel) having a backlight and a liquid-crystal panel and displays an image based on a display signal input from the layout unit 103 to the display unit 104 on the display screen of the display unit 104. Note that the display unit 104 may be a modulation type (a transmission or reflection type) display module that modulates (transmits or reflects) light from a light source to display an image or may be a self-emitting display module such as an organic EL panel.

The display control unit 105 is a processing circuit that performs a program stored in advance in a non-volatile memory (not shown) provided in the display apparatus 100 to control the respective blocks of the display apparatus 100. The display control unit 105 receives a user operation for buttons or the like provided on the housing of the display apparatus 100 and controls the respective blocks on the basis of the user operation. Specifically, the display control unit 105 controls the respective blocks on the basis of setting brightness, a color gamut type, an EOTF type, a display range, system gamma value, enablement/disablement of a comparison display mode, comparison brightness, or the like specified (set) by a user operation.

Hereinafter, the display of one image in a multi-display or the display of one area in an area-dividing display will be described as a "main display", and the display of each of remaining images in the multi-display or the display of each of remaining areas in the area-dividing display will be described as a "sub-display". Setting brightness is the upper-limit brightness of a main display, and a color gamut type, an EOTF type, a display range, a system gamma value, or the like other than the setting brightness is also specified for the main display. A comparison display mode is a mode in which a multi-display is performed, and comparison brightness is the upper-limit brightness of a sub-display. The comparison display mode may be a mode in which an area-dividing display is performed, and the mode of the display apparatus 100 may be switchable between a plurality of modes such as a mode in which a multi-display is performed, a mode in which an area-dividing display is performed, and a mode in which both the multi-display and the area-dividing display are not performed. In the case of a multi-display in which at least three images are displayed side by side or an area-dividing display in which an image is divided and displayed in at least three areas, comparison brightness is separately specified for respective sub-displays.

Note that the display control unit 105 may automatically determine comparison brightness on the basis of setting brightness. As an example, consideration is given to a case in which a multi-display in which two images are displayed side by side or an area-dividing display in which an image is divided and displayed in two areas is performed. In this case, comparison brightness may be determined from setting brightness on the basis of the predetermined relationship between the setting brightness and the comparison brightness as shown in FIG. 2. In the example of FIG. 2, the comparison brightness is determined to be 1000 cd/m$^2$ when the setting brightness is 2000 cd/m$^2$, and the comparison brightness is determined to be 600 cd/m$^2$ when the setting brightness is 1000 cd/m$^2$. If respective setting brightness is associated with a plurality of comparison brightness in advance, the comparison brightness of respective sub-displays may be determined from the setting brightness in the case of a multi-display in which at least three images are displayed side by side or an area-dividing display in which an image is divided and displayed in at least three areas. Note that a method for automatically determining comparison brightness is not particularly limited so long as brightness different from setting brightness (brightness lower or higher than the setting brightness) is determined to be the comparison brightness. Further, a user may be caused to specify comparison brightness in a menu for receiving a user operation shown in FIG. 12 that will be described later.

When the comparison display mode is enabled (when performing a multi-display), the display control unit 105 instructs the input unit 101 to duplicate an image signal and output a plurality of image signals. When the comparison display mode is disabled, the display control unit 105 instructs the input unit 101 to output one image signal without duplicating the image signal. Also, when performing an area-dividing display, the display control unit 105 instructs the input unit 101 to output one image signal without duplicating the image signal.

When the comparison display mode is enabled (when performing a multi-display), the display control unit 105 indicates an area in which an image is arranged (a combination of a position and a size, a combination of a start point and an end point, or the like) to the layout unit 103 for each of a plurality of image signals. For example, when performing a multi-display in which two images are displayed side by side, the display control unit 105 indicates areas in which the images are displayed to the layout unit 103 such that the two images are displayed side by side. When the comparison display mode is disabled, the display control unit 105 indicates an area in which an image is arranged to the layout unit 103 such that one image signal is displayed on the whole display surface. Also, when performing an area-dividing display, the display control unit 105 indicates an area in which an image is arranged to the layout unit 103 such that one image signal is displayed on the whole display surface.

The display control unit 105 calculates the brightness gain value of a main display from setting brightness regardless of whether the comparison display mode is enabled, and indicates the brightness gain value, the color gamut type, the EOTF type, the display range, the system gamma value, or the like of the main display to the image processing unit 102. The brightness gain value of the main display is calculated by dividing the setting brightness by the upper limit of the displayable brightness in the display apparatus 100. A display in a case in which the comparison display mode is disabled (a display in a case in which only one image signal is displayed) is the same as the main display. When the comparison display mode is enabled (when performing a multi-display), the display control unit 105 calculates the brightness gain value of a sub-display from comparison brightness. In addition, the display control unit 105 determines other parameters (the color gamut type, the EOTF type, the display range, the system gamma value, or the like) of a sub-display on the basis of comparison brightness and the EOTF type of a main display. Then, the display control unit 105 indicates the brightness gain value, the color gamut, the EOTF type, the display range, the system gamma value, or the like of the sub-display to the image processing unit 102. Also, when performing an area-dividing display, the display control unit 105 determines the parameters of a sub-display as in the case of performing a multi-display and indicates the determined parameters to the image processing unit 102. In the case of a multi-display in which at least three images are displayed side by side or an area-dividing display in which an image is divided and displayed in at least three areas, the processing is separately performed for respective sub-displays.

Figure 3:
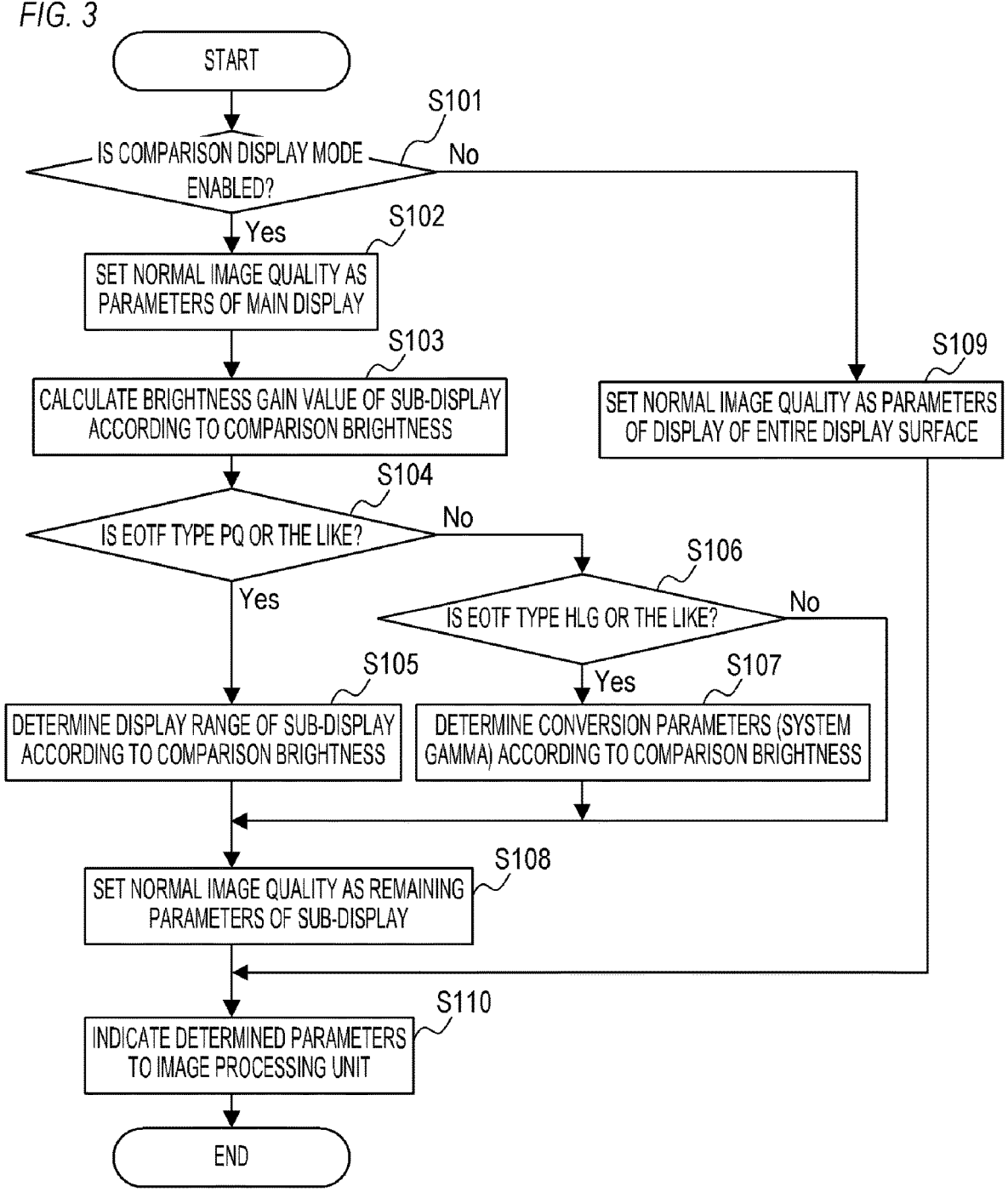
FIG. 3 is a flowchart showing an example of parameter determination processing according to the first embodiment.

FIG. 3 is a flowchart showing an example of parameter determination processing (processing to determine parameters such as a brightness gain value, a color gamut type, an EOTF type, a display range, and a system gamma value) performed by the display control unit 105. For example, the display control unit 105 starts the parameter determination processing of FIG. 3 as the enablement/disablement of the comparison display mode is changed (switched) by a user operation.

In step S101, the display control unit 105 determines whether the comparison display mode is enabled. The processing proceeds to step S102 when the comparison display mode is enabled. On the contrary, the processing proceeds to step S109 when the comparison display mode is disabled.

In step S102, the display control unit 105 determines the parameters of normal image quality as the parameters (such as a brightness gain value, a color gamut type, an EOTF type, and a system gamma value; image processing contents) of a main display. Then, the processing proceeds to step S103. The parameters of the normal image quality include a brightness gain value calculated from setting brightness specified by a user, and a color gamut type, an EOTF type, a display range, a system gamma value, or the like specified by a user operation. The main display is, for example, the display of a left (left screen) image in a multi-display in which two images are displayed side by side. When the setting brightness is 2000 cd/m², the upper limit of the displayable brightness in the display apparatus 100 is also 2000 cd/m². Therefore, 1 (=2000/2000) is calculated as the brightness gain value of the main display (the brightness gain value of the normal image quality).

In step S103, the display control unit 105 calculates the brightness gain value of a sub-display from the upper limit (2000 cd/m²) of the displayable brightness in the display apparatus 100 and comparison brightness specified by the user. Then, the processing proceeds to step S104. When the comparison brightness is 1000 cd/m², 0.5 (=1000/2000) is calculated as the brightness gain value of the sub-display. As image processing is performed using the brightness gain value 0.5, the upper-limit brightness of the sub-display becomes brightness (1000 cd/m²) that is 0.5 times as large as the upper limit (2000 cd/m²) of the displayable brightness in the display apparatus 100. The sub-display is, for example, the display of a right (right screen) image in the multi-display in which the two images are displayed side by side.

In step S104, the display control unit 105 determines whether the EOTF type of the main display (the EOTF type specified by the user) is an EOTF type dealing with the HDR (High Dynamic Range) of absolute brightness. PQ is the EOTF type dealing with the HDR of the absolute brightness. The processing proceeds to step S105 when the EOTF type of the main display is the EOTF type dealing with the HDR of the absolute brightness. On the contrary, the processing proceeds to step S106 when the EOTF type of the main display is not the EOTF type dealing with the HDR of the absolute brightness.

In step S105, the display control unit 105 determines the display range of the sub-display according to the comparison brightness. Then, the processing proceeds to step S108. For example, a brightness range of up to the comparison brightness is determined as the display range of the sub-display. When the comparison brightness is 1000 cd/m², a brightness range of up to 1000 cd/m² (0 to 1000 cd/m²) is determined as the display range of the sub-display. Note that the display range of the main display is specified by the user. For example, a brightness range of up to 2000 cd/m² (a brightness range of 0 to 2000 cd/m²) is specified as the display range of the main display.

In step S106, the display control unit 105 determines whether the EOTF type of the main display is an EOTF type dealing with the HDR of relative brightness and requiring gradation conversion in which an image gradation value is converted into a gradation value corresponding to display brightness. HLG is an EOTF type dealing with the HDR of relative brightness and requiring gradation conversion. When the EOTF type of the main display is the EOTF type dealing with the HDR of relative brightness and requiring gradation conversion, the processing proceeds to step S107. On the contrary, when the EOTF type of the main display is not the EOTF type dealing with the HDR of relative brightness and requiring gradation conversion, the processing proceeds to step S108.

In step S107, the display control unit 105 determines conversion parameters for the gradation conversion of the sub-display according to the comparison brightness. Then, the processing proceeds to step S108. For example, when the EOTF type of the main display is the HLG, a system gamma value is calculated as a conversion parameter using a calculation formula stipulated in ITU-R BT.2100. When the comparison brightness is 1000 cd/m², 1.2 is calculated as a system gamma value of the sub-display. Note that a system gamma value of the main display is specified by the user. For example, 1.33 is specified as a system gamma value of the main display.

In step S108, the display control unit 105 determines the same parameters as those of the main display as the remaining parameters (the remaining image processing contents) of the sub-display. Then, the processing proceeds to step S110. For example, when the EOTF type of the main display is the PQ, the brightness gain value of the sub-display is determined in step S103 and the display range of the sub-display is determined in step S105. Therefore, the same parameters as those of the main display are determined as the parameters (such as the EOTF type and the color gamut type) other than the brightness gain value and the display range.

FIG. 4 shows an example of a method for determining various parameters when the comparison display mode is enabled. As for a main display, all the parameters are specified by a user. As for a sub-display, a display range in a case in which the EOTF type of the main display is PQ and a system gamma value in a case in which the EOTF type of the main display is HLG are calculated from comparison brightness specified by the user. A brightness gain value is also calculated from the comparison brightness (and the upper limit of the displayable brightness in the display apparatus 100). The remaining parameters are the same as those of the main display.

FIG. 5 shows an example of the options of various parameters on a sub-display. The comparison display mode is switchable between enablement and disablement. As comparison brightness, it is possible to set a brightness of 100 to 1000 cd/m². As a display range in a case in which an EOTF type is PQ, it is possible to set a range in which any brightness of 100 to 1000 cd/m² is maximum brightness. An image area having brightness higher than a value set here is clipped and displayed at the setting value. When the comparison brightness is set (changed), the display range is automatically set according to the comparison brightness. A user may change the display range after the display range is automatically set. In this case, the user specifies a brightness of 100 to 1000 cd/m² as the maximum brightness of the display range. As a system gamma value in a case in which the EOTF type is HLG, it is possible to set a value of 1.0 to 1.5. When the comparison brightness is set (changed), the system gamma value is automatically set according to the comparison brightness. The user may change the system gamma value after the system gamma value is automatically set.

In step S109, the display control unit 105 determines the parameters of the normal image quality as parameters (image processing contents) for displaying one image signal on the whole display surface. Then, the processing proceeds to step S110.

In step S110, the display control unit 105 indicates the determined parameters (image processing contents) to the image processing unit 102. Then, the display control unit 105 ends the parameter determination processing. When the parameters are indicated to the image processing unit 102, the image processing unit 102 performs image processing corresponding to the parameters. For example, when the EOTF type is the PQ, the image processing unit 102 performs brightness conversion in which the brightness of an image is converted according to an indicated (set) display range. When the EOTF type is the HLG, the image processing unit 102 performs gradation conversion in which the gradation value of an image is converted using an indicated (set) system gamma value. As a result, a multi-display, an area-dividing display, or the like is performed on the display unit 104 with image quality corresponding to the parameters.

Figure 6A:
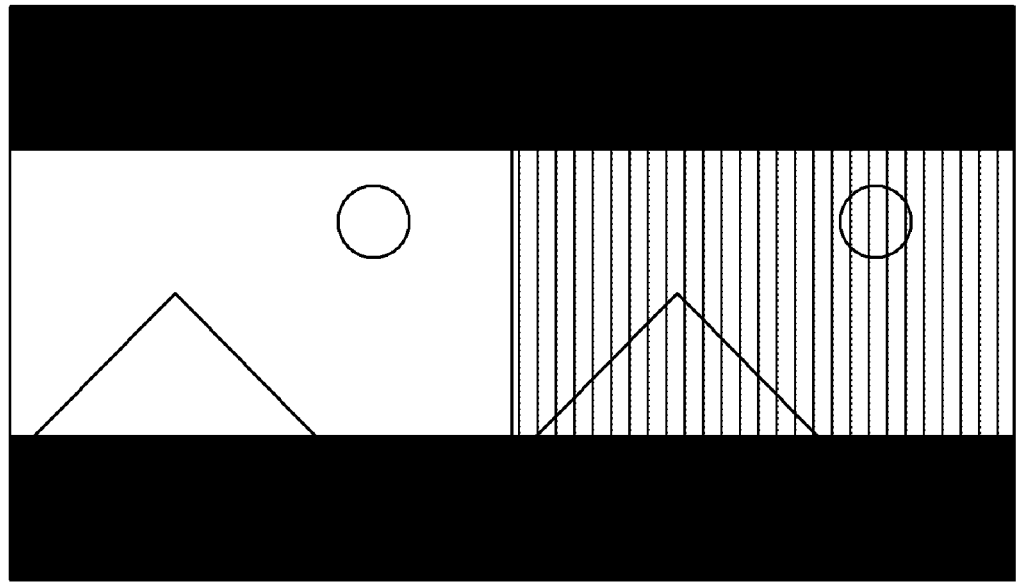
FIGS. 6A to 6C are diagrams showing a display example according to the first embodiment.
Figure 6B:
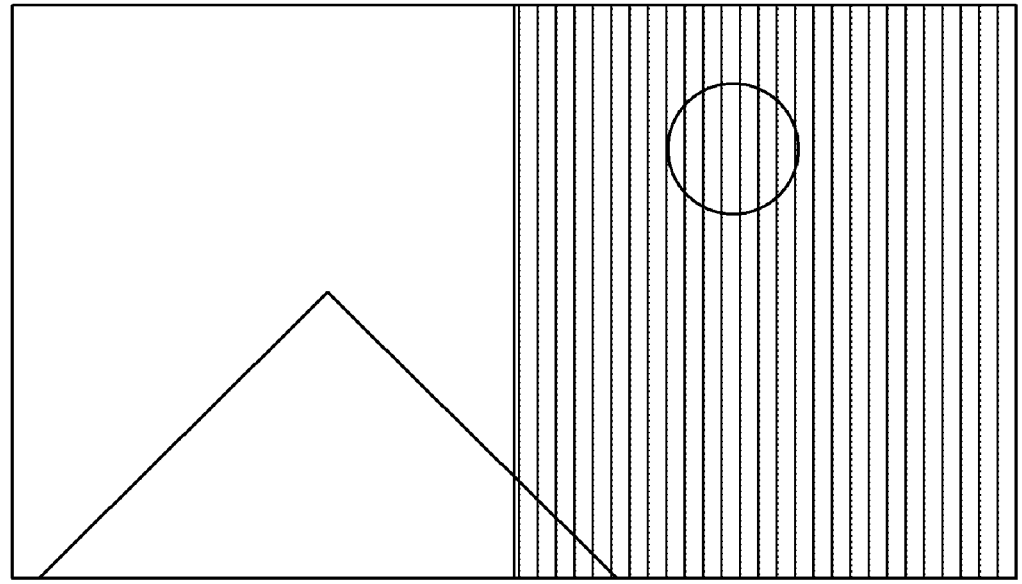
Figure 6C:
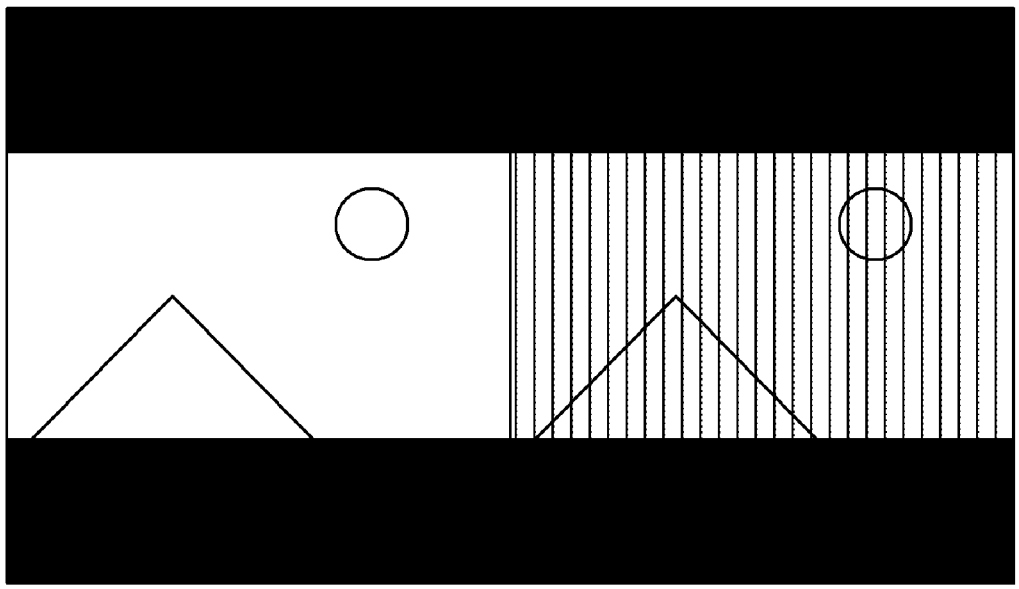

FIGS. 6A to 6C show a display example of the display unit 104.

FIG. 6A shows a multi-display in which two images are displayed side by side. In FIG. 6A, the EOTF type of a main display (the display of a left image) is PQ. Therefore, the EOTF type of a sub-display (the display of a right image) is also PQ (step S108 of FIG. 3). Further, in FIG. 6A, a comparison brightness of 1000 cd/m$^2$ is specified. Therefore, a brightness range of up to 1000 cd/m$^2$ (a brightness range of 0 to 1000 cd/m$^2$) is determined as the display range of the sub-display (step S105 of FIG. 3). Note that the setting brightness of the main display is 2000 cd/m$^2$ and the display range thereof is a brightness range of 0 to 2000 cd/m$^2$.

Figure 7:
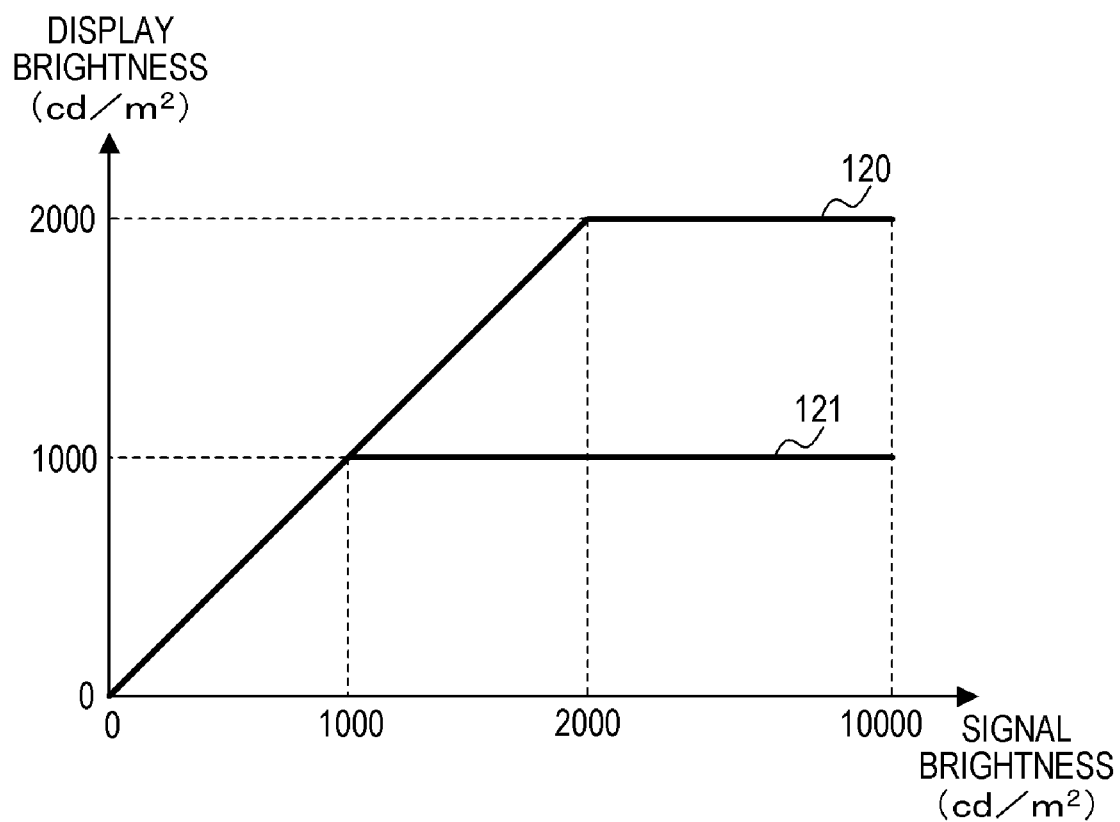
FIG. 7 is a diagram showing an example of the relationship between signal brightness and display brightness according to the first embodiment.

FIG. 7 shows the relationship between signal brightness (brightness represented by an image signal input to the image processing unit 102; brightness before image processing (before brightness conversion)) and display brightness (brightness after the image processing (after the brightness conversion)) in the multi-display of FIG. 6A. A line 120 shows the relationship between the signal brightness and the display brightness of the main display (left). A line 121 shows the relationship between the signal brightness and the display brightness of the sub-display (right). In the main display, a signal brightness of not more than 2000 cd/m$^2$ is displayed with display brightness same as the signal brightness, and a signal brightness of higher than 2000 cd/m$^2$ is displayed with halation of 2000 cd/m$^2$. In the sub-display, a signal brightness of not more than 1000 cd/m$^2$ is displayed with display brightness same as the signal brightness, and a signal brightness of higher than 1000 cd/m$^2$ is displayed with halation of 1000 cd/m$^2$.

FIG. 6B shows an area-dividing display in which one image is divided into two right and left areas and displayed on the whole display surface. In FIG. 6B, the EOTF type of a main display (the display of a left area) is PQ. Therefore, the EOTF type of a sub-display (the display of a right area) is also PQ (step S108 of FIG. 3). Further, in FIG. 6B, a comparison brightness of 1000 cd/m$^2$ is also specified. Therefore, a brightness range of up to 1000 cd/m$^2$ (a brightness range of 0 to 1000 cd/m$^2$) is determined as the display range of the sub-display (step S105 of FIG. 3). Like FIG. 6A, the setting brightness of the main display is 2000 cd/m$^2$ and the display range thereof is a brightness range of 0 to 2000 cd/m$^2$.

FIG. 6C shows a multi-display in which two images are displayed side by side. In FIG. 6C, the EOTF type of a main display (the display of a left image) is HLG. Therefore, the EOTF type of a sub-display (the display of a right image) is also HLG (step S108 of FIG. 3). Further, in FIG. 6C, a comparison brightness of 1000 cd/m$^2$ is also specified. Therefore, 1.2 is determined as the system gamma value of the sub-display (step S107 of FIG. 3). Note that the setting brightness of the main display is 2000 cd/m$^2$ and the system gamma value thereof is 1.33.

As described above, according to the first embodiment, various parameters of a sub-display are automatically set according to comparison brightness and the EOTF type of a main display, and image processing for the sub-display is performed. Thus, a user is allowed to easily confirm a difference in the display image quality (the image quality of a display) between a plurality of display apparatuses having different displayable upper-limit brightness without specifying various parameters of a sub-display. For example, the user is allowed to easily confirm a plurality of displays having different brightness and the same EOTF type (each having HDR).

Note that an example in which the upper-limit brightness of a display is controlled (changed) by controlling image processing according to a brightness gain value is described above but a method for controlling the upper-limit brightness of a display is not limited to the example. For example, the upper-limit brightness of a display may be controlled by controlling the light-emitting brightness of a light source such as a backlight for each of a plurality of areas of a display surface. The upper-limit brightness of a display may be controlled by combining the control of image processing and the control of the light-emitting brightness of a light source together.

Second Embodiment: Hereinafter, a second embodiment will be described. In the second embodiment, an example in which brightness distribution information showing the brightness distribution of a target of image processing by an image processing unit 102 (an image signal input to the image processing unit 102; an image signal before image processing by the image processing unit 102) in addition to the comparison display of the first embodiment is further displayed will be described. Specifically, an example in which a waveform monitor is generated as brightness distribution information for each of a main display and a sub-display and the two generated waveform monitors (a waveform monitor corresponding to the main display and a waveform monitor corresponding to the sub-display) are further displayed will be described. Further, an example in which a used EOTF type is PQ and a waveform monitor corresponding to a sub-display is generated such that the difference between the display range of a main display and the display range of the sub-display is identifiable in the display of the waveform monitor will be described. Note that in the second embodiment, a display having the highest maximum brightness in a display range is a main display and the remaining display is a sub-display in a comparison display. Brightness distribution information is not limited to a waveform monitor but may be a brightness histogram or the like. Hereinafter, points (such as configurations and processing) different from those of the first embodiment will be described in detail, and the same points as those of the first embodiment will be omitted where necessary.

FIG. 8 is a block diagram showing a configuration example of a display apparatus 200 according to the second embodiment. The display apparatus 200 has an input unit 201, an image processing unit 102, a combining unit 203, a display unit 104, a display control unit 205, and a waveform monitor generation unit 206. Note that in FIG. 8, arrows (control lines for controlling respective blocks) from the display control unit 205 are omitted. Further, the same blocks as those of FIG. 1 (first embodiment) are denoted by the same symbols.

The input unit 201 performs the same processing as that of the input unit 101 of the first embodiment. In addition, the input unit 201 outputs the same image signal as an image signal output to the image processing unit 102 to the waveform monitor generation unit 206 in response to instructions from the display control unit 205.

The combining unit 203 performs layout processing on one or a plurality of image signals input from the image processing unit 102 to the combining unit 203 and one or a plurality of waveform monitors input from the waveform monitor generation unit 206 to the combining unit 203. Thus, a display signal in which one or a plurality of images and one or a plurality of waveform monitors are arranged is generated. The combining unit 203 outputs a generated display signal to the display unit 104. Note that like an area in which an image is arranged (a combination of a position and a size, a combination of a start point and an end point, or the like), an area in which a waveform monitor is arranged is also indicated from the display control unit 205.

The display control unit 205 performs the same processing as that of the display control unit 105 of the first embodiment. In addition, the display control unit 205 instructs the waveform monitor generation unit 206 to generate a waveform monitor.

FIG. 9 is a flowchart showing an example of a waveform monitor instruction processing (processing to instruct the generation of a waveform monitor) performed by the display control unit 205. For example, the display control unit 205 starts the waveform monitor instruction processing of FIG. 9 as the enablement/disablement of a waveform monitor display setting for displaying a waveform monitor is changed (switched).

In step S201, the display control unit 205 determines whether the waveform monitor display setting is enabled. The processing proceeds to step S202 when the waveform monitor display setting is enabled. On the contrary, the processing proceeds to step S205 when the waveform monitor display setting is disabled.

In step S202, the display control unit 205 determines whether a comparison display mode is enabled. The processing proceeds to step S203 when the comparison display mode is enabled. On the contrary, the processing proceeds to step S204 when the comparison display mode is disabled.

In step S203, the display control unit 205 instructs the waveform monitor generation unit 206 to generate a plurality of waveform monitors corresponding to a plurality of displays (a main display and a sub-display) performed, respectively. Then, the display control unit 205 ends the waveform monitor instruction processing.

In step S204, the display control unit 205 instructs the waveform monitor generation unit 206 to generate one waveform monitor corresponding to one display (the display of only one image signal) performed. Then, the display control unit 205 ends the waveform monitor instruction processing.

In step S205, the display control unit 205 instructs the waveform monitor generation unit 206 not to generate a waveform monitor. Alternatively, the display control unit 205 does not give instructions to generate a waveform monitor to the waveform monitor generation unit 206. Then, the display control unit 205 ends the waveform monitor instruction processing.

Here, at the time of instructing the waveform monitor generation unit 206 to generate a waveform monitor, the display control unit 205 transmits display color information to the waveform monitor generation unit 206. The display color information is information showing the color of a waveform in a waveform monitor for each brightness range. When performing a comparison display such as a multi-display and an area-dividing display, the display control unit 205 determines display color information on the basis of the display range of a main display and the display range of a sub-display. The display color information of a waveform monitor in a case in which only one image signal is displayed is the same as the display color information of a waveform monitor corresponding to a main display.

The display control unit 205 generates the display color information of a waveform monitor corresponding to a main display such that the following displays are, for example, performed.

The waveform of the display range of the main display is displayed in a white color showing that halation is not caused (the waveform is not displayed in a clipped state).

The waveform of the range of brightness higher than the maximum brightness of the display range of the main display is displayed in a red color showing that halation is caused (the waveform is displayed in a clipped state).

The display control unit 205 generates the display color information of a waveform monitor corresponding to a sub-display such that the following displays are, for example, performed.

The waveform of the display range of the sub-display is displayed in a white color showing that halation is not caused.

The waveform of a brightness range obtained by excluding the display range of the sub-display from the display range of the main display is displayed in an orange color showing that halation is caused only in the sub-display.

The waveform of the range of brightness higher than the maximum brightness of the display range of the main display is displayed in a red color showing that halation is caused in both the main display and the sub-display.

FIG. 10 shows an example of display color information in a case in which the display range of a main display is 2000 $cd/m^2$ and the display range of a sub-display is 1000 $cd/m^2$. In the example of FIG. 10, the waveform of a brightness range having a brightness of not more than 2000 $cd/m^2$ is displayed in a white color, and the waveform of a brightness range having a brightness of higher than 2000 $cd/m^2$ is displayed in a red color in a waveform monitor corresponding to the main display. In a waveform monitor corresponding to the sub-display, the waveform of a brightness range having a brightness of not more than 1000 $cd/m^2$ is displayed in a white color, and the waveform of a brightness range having a brightness of higher than 1000 $cd/m^2$ and not more than 2000 $cd/m^2$ is displayed in an orange color. Further, the waveform of a brightness range having a brightness of higher than 2000 $cd/m^2$ is displayed in a red color.

Note that the range of brightness higher than the maximum brightness of the display range of the sub-display is not divided into a plurality of ranges but the waveform of the range of the brightness higher than the maximum brightness of the display range of the sub-display may be displayed in a red color in the waveform monitor corresponding to the sub-display. The colors of waveforms are not particularly limited so long as the waveforms of the various brightness ranges described above are identifiable. Further, an example in which the waveforms of various brightness ranges are identifiable by colors is described above. However, a method for displaying the waveforms of various brightness ranges so as to be identifiable is not particularly limited. For example, by changing the presence or absence of the blinking, the speed, or the like of a waveform, the waveforms of various brightness ranges may be identifiable.

When the display control unit 205 instructs the waveform monitor generation unit 206 to generate a waveform monitor, the waveform monitor generation unit 206 generates the waveform monitor of an image signal input from the input unit 201 to the waveform monitor generation unit 206. The waveform monitor is generated on the basis of an EOTF type and display color information output from the display control unit 205. The waveform monitor generation unit 206 outputs a generated waveform monitor to the combining unit 203.

Figure 11:
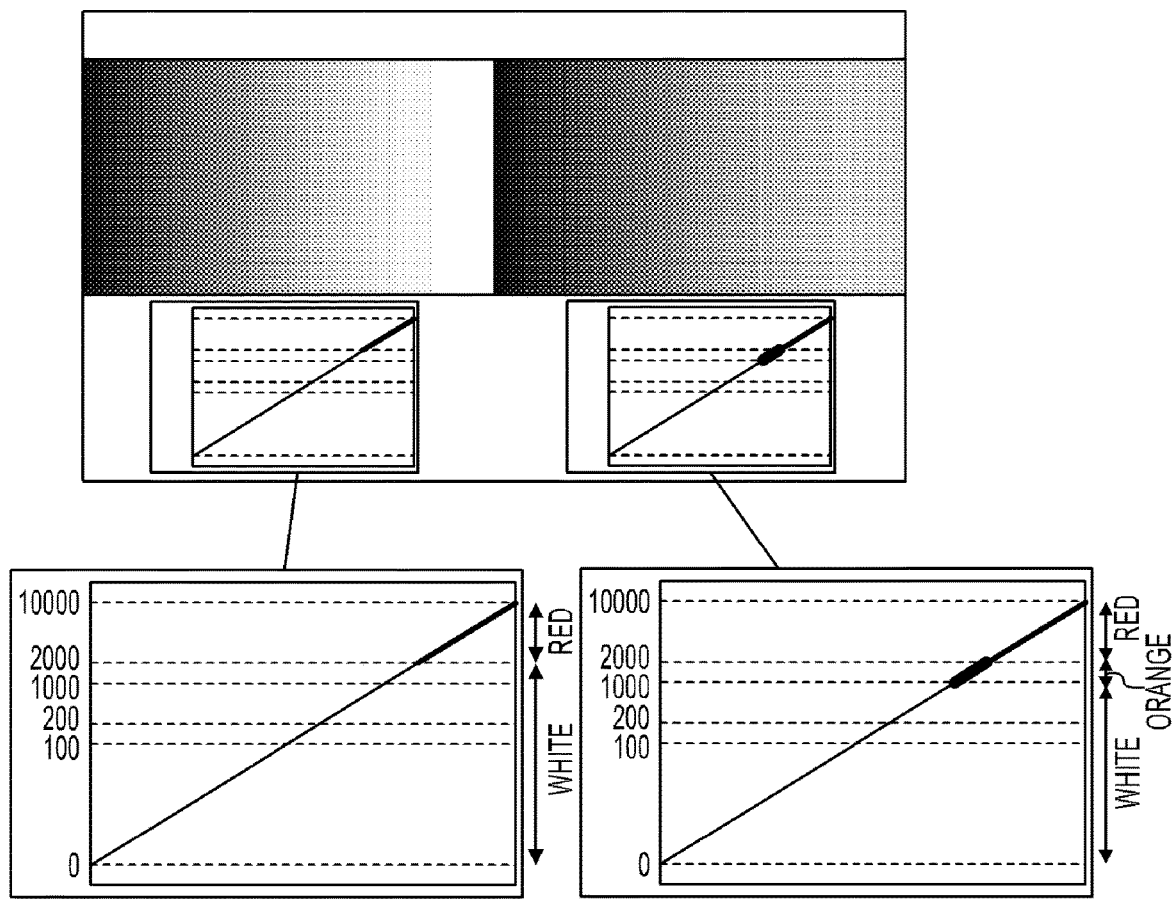
FIG. 11 is a diagram showing a display example according to the second embodiment.

FIG. 11 shows a display example of the display unit 104. In FIG. 11, a multi-display in which two images are displayed side by side is performed. As described above, an EOTF type is PQ. As for a main-display (the display of a left image), setting brightness is 2000 cd/m$^2$, and a display range is a brightness range of 0 to 2000 cd/m$^2$. As for a sub-display (the display of a right image), comparison brightness is 1000 cd/m$^2$, and a display range is a brightness range of 0 to 1000 cd/m$^2$. In FIG. 11, two waveform monitors are displayed corresponding to the two displays of the main display and the sub-display, respectively.

In the waveform monitor corresponding to the main display, the waveform of a brightness range having a brightness of not more than 2000 cd/m$^2$ is displayed in a white color, and the waveform of a brightness range having a brightness of higher than 2000 cd/m$^2$ is displayed in a red color. That is, the waveform of the brightness range in which halation is caused in the main display is displayed in the red color.

In the waveform monitor corresponding to the sub-display, the waveform of a brightness range having a of brightness of not more than 1000 cd/m$^2$ is displayed in a white color, and the waveform of a brightness range having a brightness of higher than 1000 cd/m$^2$ and not more than 2000 cd/m$^2$ is displayed in an orange color. Further, the waveform of a brightness range having a brightness of higher than 2000 cd/m$^2$ is displayed in a red color. That is, the waveform of the brightness range in which halation is caused in both the main display and the sub-display is displayed in the red color, and the waveform of the brightness range in which halation is caused only in the sub-display is displayed in the orange color.

Figure 12:
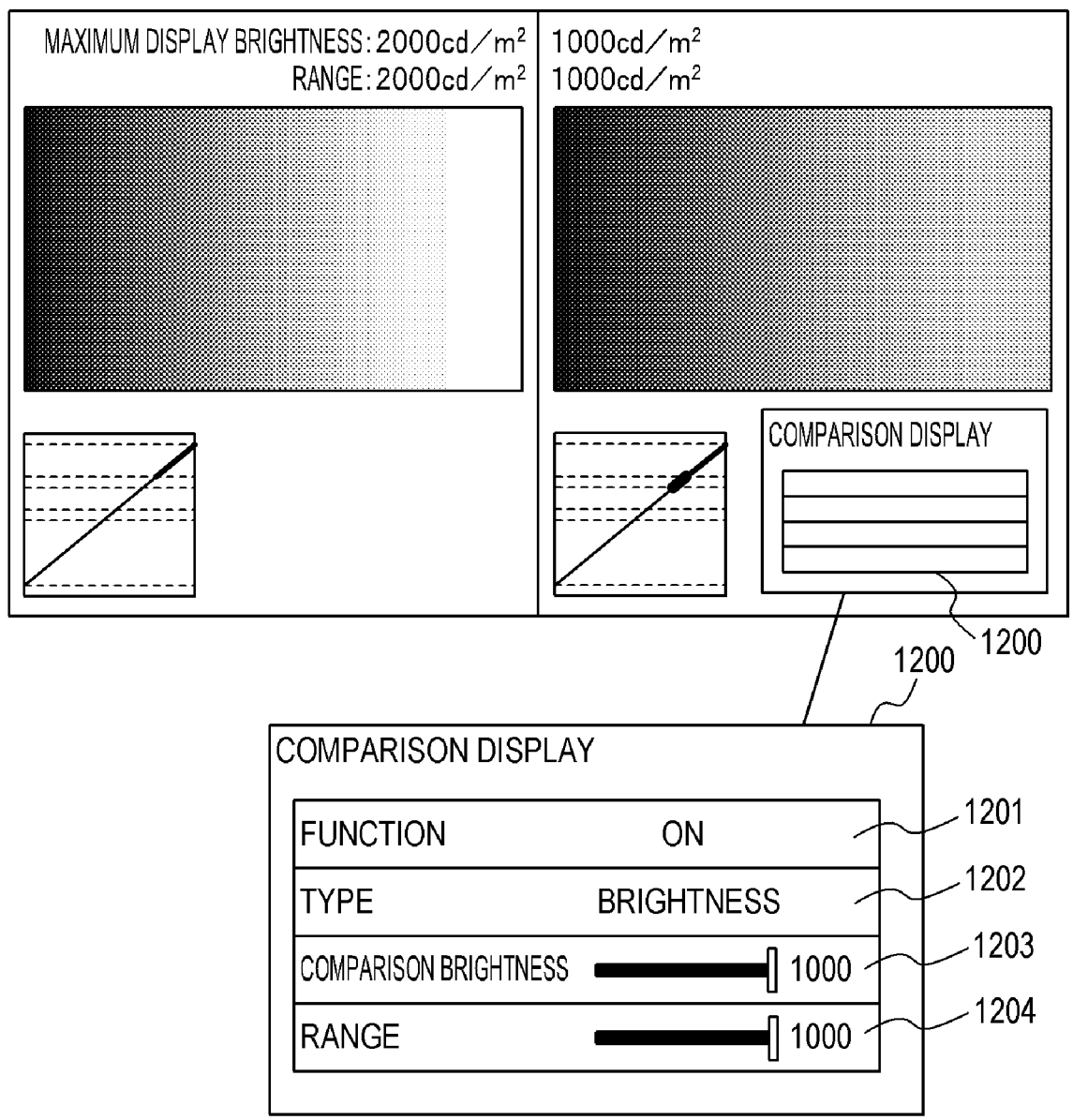
FIG. 12 is a diagram showing a display example according to the second embodiment.

FIG. 12 shows another display example of the display unit 104. Like FIG. 11, a main display, a sub-display, the display of a waveform monitor corresponding to the main display, and the display of a waveform monitor corresponding to the sub-display are also performed as in FIG. 12. In addition, in FIG. 12, maximum display brightness (setting brightness or comparison brightness) and a display range are displayed at the upper part in each of the main display and the sub-display, and the maximum display brightness and the display range are recognizable at a glance for a user. In FIG. 12, a menu 1200 for receiving a user operation is displayed. The menu 1200 includes items 1201 to 1204. The item 1201 is an item for specifying the enablement/disablement (ON/OFF) of a comparison display mode. The item 1202 is an item for specifying a comparison type in the comparison display mode. The comparison type includes "brightness comparison" in which a plurality of HDR displays (or a plurality of SDR (Standard Dynamic Range) displays) having different maximum brightness are compared with each other, "HDR/SDR" in which an HDR display and an SDR display are compared with each other, or the like. The item 1203 is an item for specifying comparison brightness in a case in which the comparison display mode is enabled. The item 1204 is an item for specifying the parameters (a display range (the maximum brightness of the display range) for PQ and a system gamma value for HLG) of a sub-display after the sub-display.

As described above, a waveform monitor (brightness distribution information) corresponding to a main display and a waveform monitor (brightness distribution information) corresponding to a sub-display are generated according to the second embodiment. Then, the main display, the sub-display, the display of the waveform monitor corresponding to the main display, and the display of the waveform monitor corresponding to the sub-display are performed together. Thus, by confirming the waveform monitors, a user is allowed to easily and specifically confirm a difference in the display image quality or the like between the main display and the sub-display.

In addition, the difference between the display range of the main display and the display range of the sub-display is identifiable in the waveform monitor corresponding to the sub-display. Specifically, a brightness range in which halation is caused in the main display and a brightness range in which the halation is not caused in the main display are identifiable in the waveform monitor corresponding to the main display. Further, a brightness range in which halation is not caused in the sub-display, a brightness range in which the halation is caused only in the sub-display, and a brightness range in which the halation is caused in both the main display and the sub-display are identifiable in the waveform monitor corresponding to the sub-display. Thus, the user is allowed to easily and more specifically confirm the difference in the above display image quality or the like. Note that it is possible to display a brightness range in which the halation is caused only in the sub-display (that is, a brightness range in which the halation is not caused only in the main display) in the waveform monitor corresponding to the main display instead of the waveform monitor corresponding to the sub-display such that the difference between the display range of the main display and the display range of the sub-display is identifiable.

Note that an example of a case in which an EOTF type is PQ is described above but the EOTF type may be HLG or the like. When the EOTF type is HLG or the like, the waveform monitor generation unit 206 may generate a waveform monitor corresponding to a main display such that a brightness range shown by the waveform monitor corresponding to the main display becomes the brightness range of the main display (the range of display brightness). Similarly, the waveform monitor generation unit 206 may generate a waveform monitor corresponding to a main display such that a brightness range shown by a waveform monitor corresponding to a sub-display becomes the brightness range of the sub-display (the range of display brightness). Specifically, when the setting brightness of a main display is 2000 cd/m$^2$, the waveform monitor generation unit 206 sets the brightness axis (the scale of the brightness axis) of a waveform monitor corresponding to the main display such that maximum brightness becomes 2000 cd/m$^2$. Similarly, when the comparison brightness of a sub-display is 1000 cd/m$^2$, the waveform monitor generation unit 206 sets the brightness axis (the scale of the brightness axis) of a waveform monitor corresponding to the sub-display such that maximum brightness becomes 1000 cd/m$^2$. The same applies to a case in which other brightness distribution information such as a brightness histogram is generated. Note that it is possible to display both a waveform monitor corresponding to a main display and a waveform monitor corresponding to a sub-display when an EOTF is PQ and display only the waveform monitor corresponding to the main display when the EOTF is HLG.

Third Embodiment: Hereinafter, a third embodiment will be described. The third embodiment will describe an example in which predetermined image processing is applied to the result of image processing for a sub-display such that the difference between the display range of a main display and the display range of the sub-display is identifiable in the sub-display when a comparison display is performed. Specifically, an example in which the over-range display of a sub-display is performed such that the above difference is identifiable when the over-range display (in which a display range and the remaining brightness range are identifiable; brightness alert) is performed in a comparison display will be described. Note that in the third embodiment, a display having the highest maximum brightness in a display range is a main display and the remaining display is a sub-display in a comparison display. The predetermined image processing is not limited to image processing for an over-range display. Hereinafter, points (such as configurations and processing) different from those of the first embodiment will be described in detail, and the same points as those of the first embodiment will be omitted where necessary.

Figure 13:
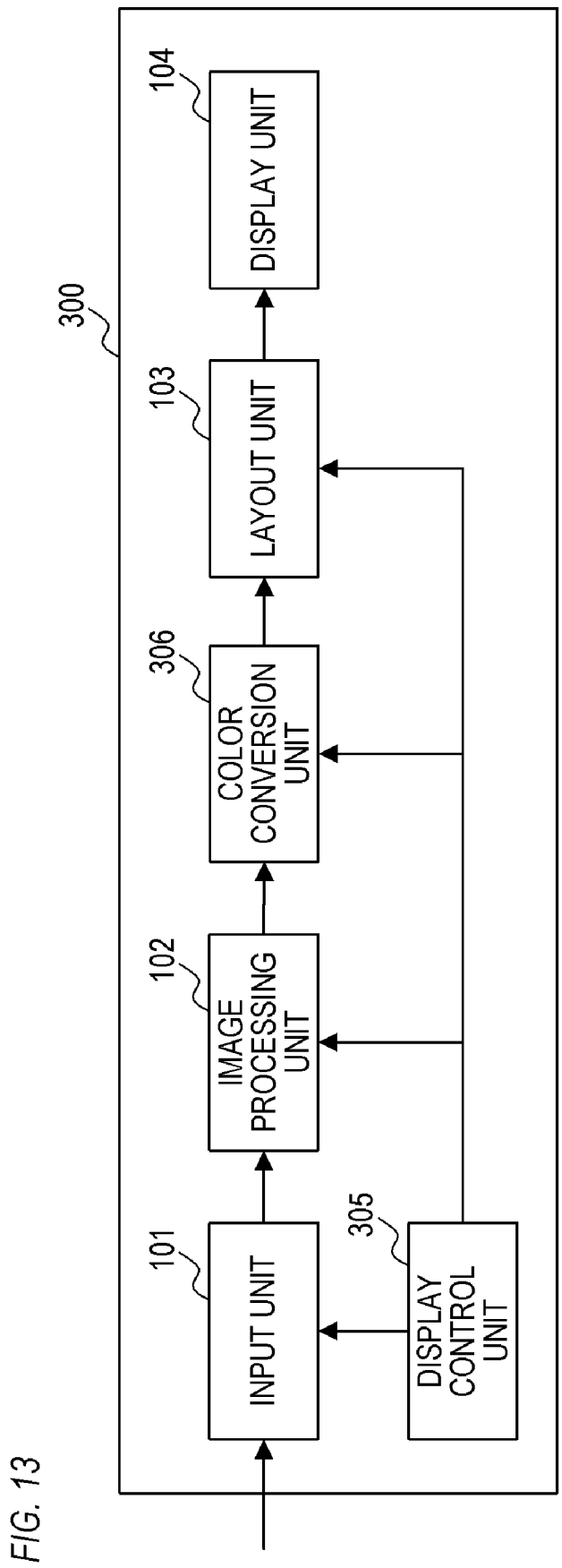
FIG. 13 is a block diagram showing a configuration example of a display apparatus according to a third embodiment.

FIG. 13 is a block diagram showing a configuration example of a display apparatus 300 according to the third embodiment. The display apparatus 300 has an input unit 101, an image processing unit 102, a layout unit 103, a display unit 104, a display control unit 305, and a color conversion unit 306. Note that in FIG. 13, the same blocks as those of FIG. 1 (first embodiment) are denoted by the same symbols.

The display control unit 305 performs the same processing as that of the display control unit 105 of the first embodiment. In addition, when a comparison display mode is enabled, the display control unit 305 determines conversion color information corresponding to a main display on the basis of the display range of the main display and determines conversion color information corresponding to a sub-display on the basis of the display range of the main display and the display range of the sub-display. Then, the display control unit 305 transmits the generated conversion color information to the color conversion unit 306 together with color conversion instructions (instructions for performing color conversion). The conversion color information is information showing the color of a comparison display for each brightness range. The conversion color information in a case in which only one image signal is displayed is the same as the conversion color information corresponding to the main display.

The display control unit 305 generates the conversion color information corresponding to the main display such that the following main display is, for example, performed.

An area in which the signal brightness (brightness expressed by an image signal input to the image processing unit 102; brightness before image processing by the image processing unit 102) is the brightness of the display range of the main display is displayed in a monochrome color showing that halation is not caused.

An area in which the signal brightness is brightness higher than the maximum brightness of the display range of the main display is displayed in a red color showing that halation is caused.

The display control unit 305 generates the conversion color information corresponding to the sub-display such that the following sub-display is, for example, performed.

An area in which the signal brightness is the brightness of the display range of the sub-display is displayed in a monochrome color showing that halation is not caused.

An area in which the signal brightness is the brightness of a brightness range excluding the display range of the sub-display from the display range of the main display is displayed in an orange color showing that halation is caused only in the sub-display.

An area in which the signal brightness is brightness higher than the maximum brightness of the display range of the main display is displayed in a red color showing that halation is caused in both the main display and the sub-display.

FIG. 14 shows an example of conversion color information in a case in which the display range of a main display is 2000 $cd/m^2$ and the display range of a sub-display is 1000 $cd/m^2$. In the example of FIG. 14, an area having a signal brightness of not more than 2000 $cd/m^2$ is displayed in a monochrome color and an area having a signal brightness of higher than 2000 $cd/m^2$ is displayed in a red color in the main display. In the sub-display, an area having a signal brightness of not more than 1000 $cd/m^2$ is displayed in a monochrome color and an area having a signal brightness of higher than 1000 $cd/m^2$ and not more than 2000 $cd/m^2$ is displayed in an orange color. Further, an area having a signal brightness of higher than 2000 $cd/m^2$ is displayed in a red color.

Note that the range of brightness higher than the maximum brightness of the display range of the sub-display is not divided into a plurality of ranges and an area having a signal brightness of higher than the maximum brightness of the display range of the sub-display may be displayed in a red color in the sub-display. The colors of the areas are not particularly limited so long as the various areas described above are identifiable. Further, an example in which various areas are identifiable by colors is described above, but a method for displaying the various areas so as to be identifiable is not particularly limited. For example, the various areas may be identifiable by the presence or absence, the speed, or the like of the blinking of the areas, or may be identifiable by displaying graphics (a zebra pattern, a frame (contour line), or the like) so as to be superimposed one upon another. In addition, the main display and the sub-display may not show a state in which halation is not caused. That is, as for an image area in which halation is not caused, an (ordinary image) may be directly displayed without performing color conversion.

As an example, consideration is given to a case in which the display range of a main display is 2000 $cd/m^2$ and the display range of a sub-display is 1000 $cd/m^2$. In this case, in the main display, a zebra pattern of left oblique lines may be displayed so as to be superimposed on an area having a signal brightness of higher than 2000 $cd/m^2$. Further, in the sub-display, a zebra pattern of left oblique lines may be displayed so as to be superimposed on an area having a signal brightness of higher than 2000 $cd/m^2$, and a zebra pattern of right oblique lines may be displayed so as to be superimposed on an area having a signal brightness of higher than 1000 $cd/m^2$ and not more than is 2000 $cd/m^2$.

When receiving color conversion instructions from the display control unit 305, the color conversion unit 306 applies color conversion processing to an image signal input from the image processing unit 102 to the color conversion unit 306 on the basis of conversion color information input from the display control unit 305 to the color conversion unit 306. The color conversion processing is processing to convert the colors of various areas in the manner described above. Then, the color conversion unit 306 outputs the image signal after the color conversion processing to the layout unit 103. When receiving a plurality of image signals, that is, when performing a multi-display, the color conversion unit 306 is capable of performing different color conversion processing between the plurality of image signals. Similarly, when performing an area-dividing display, the color conversion unit 306 is capable of performing different color conversion processing between a plurality of image areas of an image signal (a plurality of areas in an image).

FIG. 15 shows a display example of the display unit 104. In FIG. 15, a multi-display in which two images are displayed side by side is performed. An EOTF type is PQ. As for a main display (the display of a left image), setting brightness is 2000 cd/m$^2$, and a display range is a brightness range of 0 to 2000 cd/m$^2$. As for a sub-display (the display of a right image), comparison brightness is 1000 cd/m$^2$, and a display range is a brightness range of 0 to 1000 cd/m$^2$. Therefore, an image area having a brightness of higher than 1000 cd/m$^2$ is clipped at 1000 cd/m$^2$ and displayed. In FIG. 15, an over-range display is performed for each of the main display and the sub-display.

In the main display, an area having a signal brightness (brightness before image processing by the image processing unit 102) of not more than 2000 cd/m$^2$ is displayed in a monochrome color, and an area having a signal brightness of higher than 2000 cd/m$^2$ is displayed in a red color. That is, an area causing halation in the main display is displayed in the red color.

In the sub-display, an area having a signal brightness of not more than 1000 cd/m$^2$ is displayed in a monochrome color, an area having a signal brightness of higher than 1000 cd/m$^2$ and not more than 2000 cd/m$^2$ is displayed in an orange color, and an area having a signal brightness of higher than 2000 cd/m$^2$ is displayed in a red color. That is, the area causing halation in both the main display and the sub-display is displayed in the red color, and the area causing halation only in the sub-display is displayed in the orange color.

As described above, according to the third embodiment, an area corresponding to the difference between the display range of a main display and the display range of a sub-display is distinguished from other areas by coloring or the like in the over-range display of the sub-display when the over-range display is performed in a comparison display. Thus, by confirming an image signal after predetermined image processing such as coloring, a user is allowed to easily and specifically confirm a difference in the display image quality or the like between a main display and a sub-display. For example, the user is allowed to confirm a difference in a halation area or the like due to the position or the size of the halation area and a difference in a display range. Note that it is possible to display an area causing halation only in a sub-display (that is, an area not causing halation in the main display) in an orange color in the main display instead of the sub-display such that the difference between the display range of the main display and the display range of the sub-display is identifiable.

FIG. 16 shows another display example of the display unit 104. In FIG. 16, an EOTF type, a display range, and the like are the same as those of FIG. 15. In FIG. 16, a main display (upper left) before color conversion processing, a sub-display (upper right) before the color conversion processing, a main display (lower left) after the color conversion processing, and a sub-display (lower right) after the color conversion processing are performed together. For example, the input unit 101 duplicates the same image signals as an image signal input to the input unit 101 and outputs the same four image signals as the image signal input to the input unit 101. Then, the image processing unit 102 switches image processing between the four image signals, and the color conversion unit 306 switches the execution/inexecution of color conversion processing or color conversion information between the four image signals. In this manner, it is possible to perform a display as shown in FIG. 16. Since the display of both the image before the color conversion processing and the image after the color conversion processing allows a user to confirm not only the image after the color conversion processing but also the image before the color conversion processing, the user is allowed to easily and more specifically confirm a difference in the above display image quality or the like.

Fourth Embodiment: Hereinafter, a fourth embodiment will be described. In the first embodiment, an example in which one main display and one sub-display are performed is described. In the fourth embodiment, an example in which one main display and a plurality of sub-displays are performed will be described. Specifically, an example in which one main display and two sub-displays are performed with the image quality of HDR and one sub-display is performed with the image quality of SDR will be described. Hereinafter, points (such as configurations and processing) different from those of the first embodiment will be described in detail, and the same points as those of the first embodiment will be omitted where necessary.

The configuration of a display apparatus according to the fourth embodiment is the same as that of the first embodiment (FIG. 1). Note that a display apparatus 100 is capable of performing a display of up to 4000 cd/m$^2$, that is, the upper limit of displayable brightness in the display apparatus 100 is 4000 cd/m$^2$.

An image processing unit 102 is capable of performing image processing to perform the display of SDR, besides the image processing described in the first embodiment. The image processing to perform the display of SDR is not particularly limited but is conversion processing to convert an image signal using Look Up Table (LUT) data.

A display control unit 105 performs the processing described in the first embodiment. In addition, the display control unit 105 controls respective blocks such that an image (area) having a comparison brightness of 100 cd/m$^2$ is displayed with the image quality of SDR. The position of a main display, the position of sub-displays, the number of the sub-displays, setting brightness, comparison brightness, or the like is not particularly limited, but a main display having a setting brightness of 4000 cd/m$^2$ is performed in the upper-left section of a display screen in the fourth embodiment. Further, a sub-display having a comparison brightness of 2000 cd/m$^2$ is displayed in the upper-right section of the display screen, a sub-display having a comparison brightness of 1000 cd/m$^2$ is displayed in the lower-left section of the display screen, and a sub-display having a comparison brightness of 100 cd/m$^2$ is displayed in the lower-right section of the display screen.

In the fourth embodiment, the display control unit 105 instructs an input unit 101 to duplicate image signals and output four image signals when a brightness comparison mode is enabled. Then, the display control unit 105 indicates areas in which respective images are arranged to a layout unit 103 such that the four images (four image signals) are displayed so as to be arranged side by side in an upper-left section, an upper-right section, a lower-left section, and a lower-right section, respectively.

When the brightness comparison mode is enabled, the display control unit 105 performs the same processing as that of the first embodiment for a display having a setting brightness of 4000 cd/m$^2$, a display having a comparison brightness of 2000 cd/m$^2$, and a display having a comparison brightness of 1000 cd/m$^2$.

On the other hand, the display control unit 105 performs processing different from that of the first embodiment for a display having a comparison brightness of 100 cd/m$^2$. Specifically, the display control unit 105 reads LUT data stored in advance in a non-volatile memory (not shown) provided in the display apparatus 100. Then, the display control unit 105 instructs the image processing unit 102 to apply conversion processing using the read LUT data to an image signal (image signal displayed in the lower-right section) displayed with comparison brightness of 100 cd/m². The LUT data is data for converting an HDR signal (the image signal of HDR; an image signal corresponding to PQ, HLG, or the like) into an SDR signal (the image signal of SDR). In addition, the display control unit 105 determines a color gamut type of BT.709, an EOTF type of a gamma 2.2, or the like as parameters for a display having a comparison brightness of 100 cd/m² and outputs the determined parameters to the image processing unit 102. Accordingly, in the case of comparison brightness of 100 cd/m², the display of SDR is performed regardless of the EOTF type of a main display.

FIGS. 17A and 17B show an example of an image processing content according to the fourth embodiment. FIG. 17A shows a display example in a case in which the EOTF type (EOTF type specified by a user) of a main display is PQ, and FIG. 17B shows a display example in a case in which the EOTF type of the main display is HLG. The upper-limit brightness of respective displays is controlled by a brightness gain value. Specifically, the upper-limit brightness of an upper-left main display is controlled to 4000 cd/m², the upper-limit brightness of an upper-right sub-display is controlled to 2000 cd/m², the upper-limit brightness of a lower-left sub-display is controlled to 1000 cd/m², and the upper-limit brightness of a lower-right sub-display is controlled to 100 cd/m².

Figure 18A:
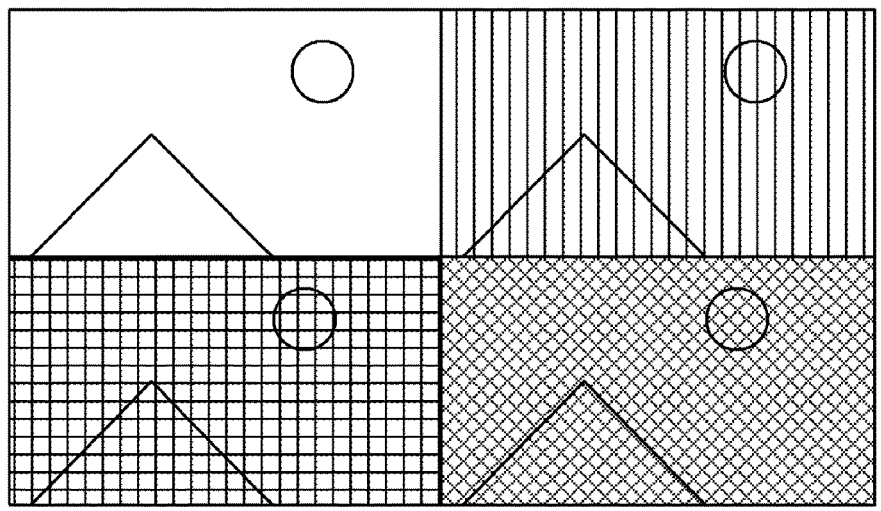
FIGS. 18A and 18B are diagrams showing a display example according to the fourth embodiment.
Figure 18B:
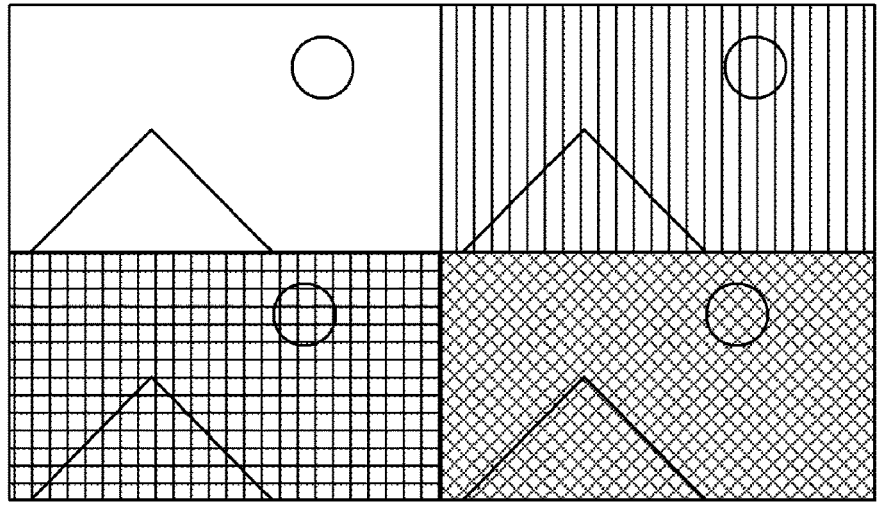
Figure 19:
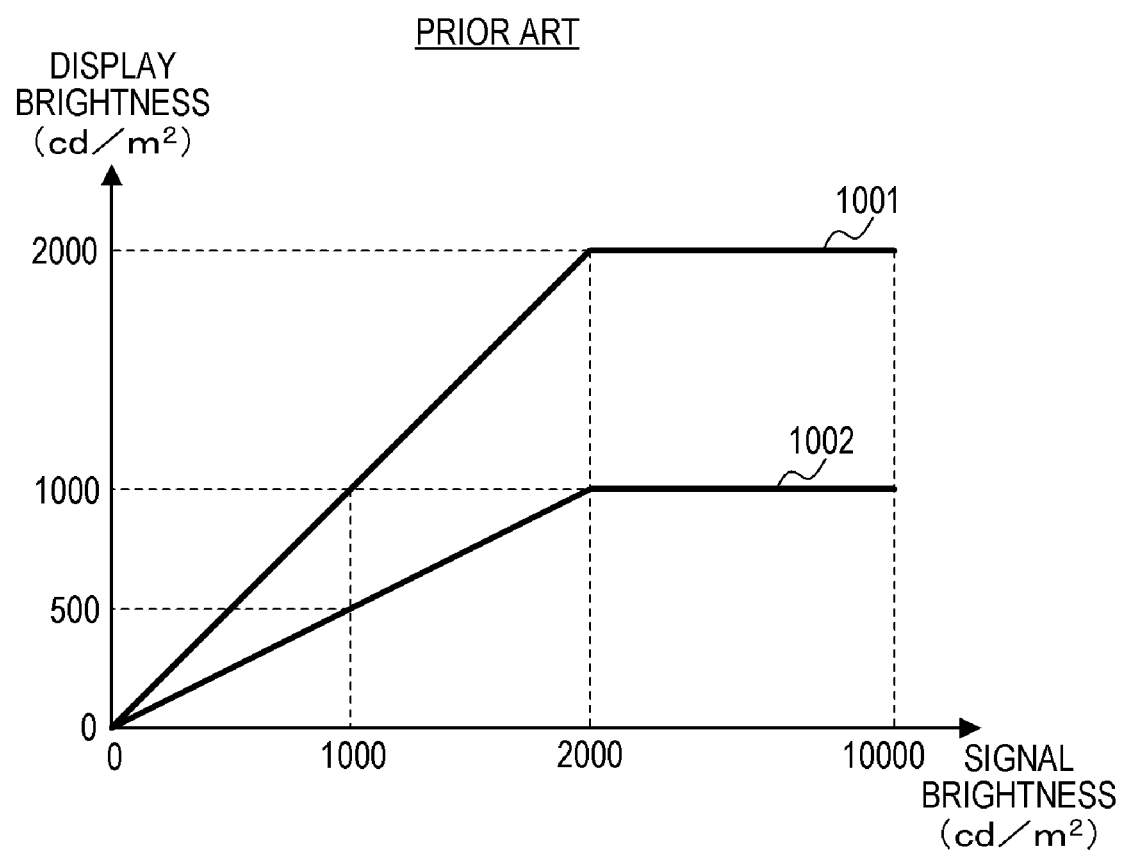
FIG. 19 is a diagram showing a prior art example of the relationship between signal brightness and display brightness.

FIGS. 18A and 18B show a display example of a comparison display according to the fourth embodiment. FIG. 18A shows a display example in a case in which the EOTF type of a main display is PQ, and FIG. 18B shows a display example in a case in which the EOTF type of the main display is HLG. Display brightness and display image quality are different between four display modes, that is, the upper-left main display, an upper-right sub-display, a lower-left sub-display, and a lower-right sub-display.

As described above, a main display and a plurality of sub-displays are performed together according to the fourth embodiment. Thus, a user is allowed to easily confirm a difference in the display image quality between at least three display apparatuses. In addition, since any of a plurality of sub-displays is performed with the image quality of SDR according to the fourth embodiment, the user is also allowed to easily confirm a difference in the display image quality between a display apparatus corresponding to HDR and a display apparatus not corresponding to the HDR (the display apparatus of the SDR).

Note that the first to fourth embodiments (including the modified examples) are given only for an example. Configurations obtained by appropriately modifying or changing the configurations of the first to fourth embodiments within the spirit of the disclosure are also included in the disclosure. Configurations obtained by appropriately combining the first to fourth embodiments together are also included in the disclosure.

According to the present disclosure, a user is allowed to easily confirm a difference in the display image quality (the image quality of displays) between a plurality of display apparatuses having different displayable upper-limit brightness.

Other Embodiments: Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions or units of one or more of the above-described embodiment(s) and/or that includes one or more circuits (e.g., application specific integrated circuit (ASIC)) for performing the functions or units of one or more of the above-described embodiment(s), and by a method performed by the computer of the system or apparatus by, for example, reading out and executing the computer executable instructions from the storage medium to perform the functions or units of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM) device, a read only memory (ROM) device, a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-052484, filed on Mar. 24, 2020, which is hereby incorporated by reference herein in its entirety.

What is claimed is:

1. A display apparatus comprising at least one memory and at least one processor which function as:
    a processing unit configured to perform first image processing and second image processing;
    a display control unit configured to perform control to perform a first display based on a result of the first image processing and a second display based on a result of the second image processing, together; and
    a setting unit configured to set upper-limit brightness of the second display, wherein
    an Electro-Optical Transfer Function (EOTF) type of the first display and an EOTF type of the second display are EOTF types dealing with high dynamic range (HDR),
    in a case where each of the EOTF type of the first display and the EOTF type of the second display is a first EOTF type, the processing unit performs a first brightness conversion to convert brightness of an image according to the upper-limit brightness set by the setting unit in the second image processing, and
    in a case where each of the EOTF type of the first display and the EOTF type of the second display is a second EOTF type which is different from the first EOTF type, the processing unit performs a second brightness conversion to convert brightness of an image according to the upper-limit brightness set by the setting unit in the second image processing, a type of the second brightness conversion being different from a type the first brightness conversion.

2. The display apparatus according to claim 1, wherein, in a case where each of the EOTF type of the first display and the EOTF type of the second display is the first EOTF type dealing with HDR of absolute brightness, the processing unit
  determines a display range of the second display according to the upper-limit brightness, and
  performs the first brightness conversion according to the determined display range in the second image processing.

3. The display apparatus according to claim 1, wherein the first EOTF type is perceptual quantizer (PQ).

4. The display apparatus according to claim 1, wherein, in a case where each of the EOTF type of the first display and the EOTF type of the second display is the second EOTF type dealing with HDR of relative brightness and requiring gradation conversion to convert a gradation value of an image into a gradation value corresponding to displayed brightness,
the processing unit
  determines a conversion parameter for the gradation conversion according to the upper-limit brightness, and
  performs gradation conversion using the determined conversion parameter as the second brightness conversion in the second image processing.

5. The display apparatus according to claim 4, wherein the second EOTF type is HLG.

6. The display apparatus according to claim 1, wherein the setting unit sets the upper-limit brightness of the second display on a basis of upper-limit brightness of the first display.

7. The display apparatus according to claim 1, wherein the at least one memory and the at least one processor further functions as a generation unit configured to generate first information showing a brightness distribution corresponding to the first display and second information showing a brightness distribution corresponding to the second display, and
the display control unit performs control to perform the first display, the second display, a display of the first information, and a display of the second information together.

8. The display apparatus according to claim 7, wherein the generation unit generates the first information or the second information such that a difference between a display range of the first display and a display range of the second display is identifiable in the display of the first information or the second information.

9. The display apparatus according to claim 1, wherein the processing unit further performs predetermined image processing such that a difference between a display range of the first display and a display range of the second display is identifiable in the first display or the second display.

10. The display apparatus according to claim 9, wherein the display control unit performs control to perform the first display or the second display to which the predetermined image processing is not applied and the first display or the second display to which the predetermined image processing is applied, together.

11. The display apparatus according to claim 1, wherein the processing unit further performs third image processing,
the display control unit performs control to perform the first display, the second display, and a third display based on a result of the third image processing,
the setting unit further sets upper-limit brightness of the third display, and the processing unit performs brightness conversion according to the upper-limit brightness of the third display set by the setting unit and the EOTF type of the first display in the third image processing.

12. The display apparatus according to claim 11, wherein, in a case where upper-limit brightness of SDR is set as the upper-limit brightness of the third display, the processing unit performs brightness conversion such that the third display becomes a display of the SDR regardless of the EOTF type of the first display.

13. A display apparatus comprising at least one memory and at least one processor which function as:
a processing unit configured to perform first image processing and second image processing;
a display control unit configured to perform control to perform a first display based on a result of the first image processing and a second display based on a result of the second image processing, together; and
a generation unit configured to generate first information showing a brightness distribution corresponding to the first display and second information showing a brightness distribution corresponding to the second display, wherein
the display control unit performs control to perform the first display, the second display, a display of the first information, and a display of the second information together,
an Electro-Optical Transfer Function (EOTF) type of the first display and an EOTF type of the second display are EOTF types dealing with high dynamic range (HDR) of absolute brightness, and
the generation unit generates the first information or the second information such that a difference between a display range of the first display and a display range of the second display is identifiable in the display of the first information or the second information.

14. A display apparatus comprising at least one memory and at least one processor which function as:
a processing unit configured to perform first image processing and second image processing; and
a display control unit configured to perform control to perform a first display based on a result of the first image processing and a second display based on a result of the second image processing, together, wherein
an Electro-Optical Transfer Function (EOTF) type of the first display and an EOTF type of the second display are EOTF types dealing with high dynamic range (HDR) of absolute brightness,
the processing unit further performs predetermined image processing such that a difference between a display range of the first display and a display range of the second display is identifiable in the first display or the second display, and
the display control unit performs control to perform the first display or the second display to which the predetermined image processing is not applied and the first display or the second display to which the predetermined image processing is applied, together.

15. A display method comprising:
performing first image processing and second image processing;
performing control to perform a first display based on a result of the first image processing and a second display based on a result of the second image processing, together; and setting upper-limit brightness of the second display, wherein an Electro-Optical Transfer Function (EOTF) type of the first display and an EOTF type of the second display are EOTF types dealing with high dynamic range (HDR), in a case where each of the EOTF type of the first display and the EOTF type of the second display is a first EOTF type, a first brightness conversion is performed to convert brightness of an image according to the upper-limit brightness in the second image processing, and in a case where each of the EOTF type of the first display and the EOTF type of the second display is a second EOTF type which is different from the first EOTF type, a second brightness conversion of which a type is different from a type of the first brightness conversion is performed to convert brightness of an image according to the upper-limit brightness set by the setting unit in the second image processing.

16. A non-transitory computer readable medium that stores a program, wherein the program causes a computer to execute a display method comprising:

performing first image processing and second image processing;

performing control to perform a first display based on a result of the first image processing and a second display based on a result of the second image processing, together; and setting upper-limit brightness of the second display, wherein an Electro-Optical Transfer Function (EOTF) type of the first display and an EOTF type of the second display are EOTF types dealing with high dynamic range (HDR), in a case where each of the EOTF type of the first display and the EOTF type of the second display is a first EOTF type, a first brightness conversion is performed to convert brightness of an image according to the upper-limit brightness in the second image processing, and in a case where each of the EOTF type of the first display and the EOTF type of the second display is a second EOTF type which is different from the first EOTF type, a second brightness conversion of which a type is different from a type of the first brightness conversion is performed to convert brightness of an image according to the upper-limit brightness set by the setting unit in the second image processing.

* * * * *